(12) United States Patent
Takahashi et al.

(10) Patent No.: US 12,552,970 B2
(45) Date of Patent: Feb. 17, 2026

(54) ADHESIVE SHEET, CONSTRUCT, AND METHOD FOR PRODUCING CONSTRUCT

(71) Applicant: LINTEC CORPORATION, Tokyo (JP)

(72) Inventors: Yoichi Takahashi, Tokyo (JP); Sho Kosaba, Tokyo (JP); Yuka Fujii, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 689 days.

(21) Appl. No.: 17/910,119

(22) PCT Filed: Dec. 2, 2020

(86) PCT No.: PCT/JP2020/044897
§ 371 (c)(1),
(2) Date: Sep. 8, 2022

(87) PCT Pub. No.: WO2021/181767
PCT Pub. Date: Sep. 16, 2021

(65) Prior Publication Data
US 2023/0272247 A1 Aug. 31, 2023

(30) Foreign Application Priority Data
Mar. 9, 2020 (JP) ................... 2020-039680

(51) Int. Cl.
*C09J 7/38* (2018.01)
*C09J 7/10* (2018.01)
*C09J 11/06* (2006.01)

(52) U.S. Cl.
CPC .............. *C09J 7/385* (2018.01); *C09J 7/10* (2018.01); *C09J 11/06* (2013.01);
(Continued)

(58) Field of Classification Search
None
See application file for complete search history.

(56) References Cited

U.S. PATENT DOCUMENTS

2018/0157125 A1 6/2018 Yasui et al.

FOREIGN PATENT DOCUMENTS

| CN | 110295013 A | 10/2019 |
| JP | 2004-237799 A | 8/2004 |

(Continued)

OTHER PUBLICATIONS

International Search Report and Written Opinion of the International Searching Authority issued in International Pat. Appl. No. PCT/JP2020/044897, dated Jan. 19, 2021, along with an English translation thereof.

(Continued)

*Primary Examiner* — Sanza L. McClendon
(74) *Attorney, Agent, or Firm* — Greenblum & Bernstein, P.L.C.

(57) ABSTRACT

An adhesive sheet including an adhesive layer composed of an adhesive having active energy ray curability and ultraviolet ray absorbability, wherein when one surface of the adhesive layer is irradiated with ultraviolet rays having a light amount of 2000 mJ/cm$^2$ to cure the adhesive layer and an infrared absorption spectrum is then measured for the irradiated surface and non-irradiated surface, the maximum absolute value of absorbance is 0.0001 to 0.012 within a wavenumber range of 700 to 1000 cm$^{-1}$ in a difference spectrum obtained by subtracting the infrared absorption spectrum of the non-irradiated surface from the infrared absorption spectrum of the irradiated surface, and when the adhesive layer is irradiated with ultraviolet rays having a light amount of 2000 mJ/cm$^2$ to cure the adhesive layer, the difference in a gel fraction of the adhesive constituting the (Continued)

adhesive layer before and after the irradiation is from 5 to 50 points.

15 Claims, 1 Drawing Sheet

(52) U.S. Cl.
CPC .... *C09J 2203/354* (2020.08); *C09J 2301/312* (2020.08); *C09J 2301/416* (2020.08)

(56) References Cited

FOREIGN PATENT DOCUMENTS

| JP | 2004-268675 A | 9/2004 | | |
|---|---|---|---|---|
| JP | 2017-003906 A | 1/2017 | | |
| JP | 2019-044023 A | 3/2019 | | |
| JP | 2019-044024 A | 3/2019 | | |
| JP | 2019167422 A | * 10/2019 | ............. | B32B 37/12 |
| JP | 2019-210446 A | 12/2019 | | |
| JP | 2020-026491 A | 2/2020 | | |

OTHER PUBLICATIONS

Office Action issued in corresponding Chinese Patent Application No. 202080056135.3 dated Jan. 19, 2023, along with English translation thereof.

* cited by examiner

[FIG. 1]
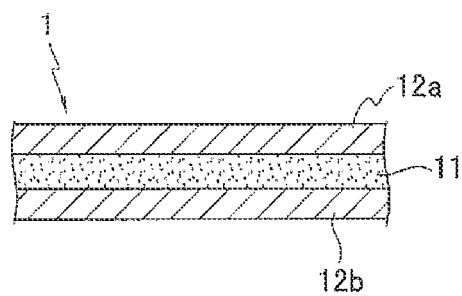
[FIG. 2]
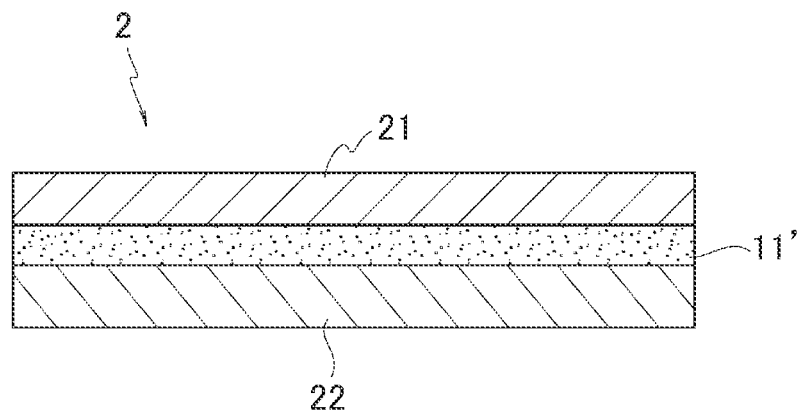

ADHESIVE SHEET, CONSTRUCT, AND METHOD FOR PRODUCING CONSTRUCT

TECHNICAL FIELD

The present invention relates to an adhesive sheet suitable for the use for a structural body such as an electronic license plate, a structural body obtained by using the adhesive sheet, and a method of producing the structural body.

BACKGROUND ART

In recent years, it has been considered to replace a conventional license plate attached to a vehicle with an electronic license plate (also referred to as an "electronic type license plate, a "digital license plate," or the like) (e.g., Patent Documents 1 and 2). The electronic license plate is provided with a display device that can electronically display the license number of a vehicle. By using the electronic license plate, it is possible to change the license number and design without changing the license plate and to display messages and advertisements to the surroundings. Electronic license plates are being considered for the use not only for vehicles but also for drones such as multicopter.

For the purpose of protecting the above-described display device, a cover material is usually laminated on the display surface side of the electronic license plate via an adhesive layer because the electronic license plate may be exposed to wind and rain or hit by flying stones while the vehicle is traveling. In addition, the electronic license plate is often exposed to ultraviolet rays for a long period of time, and therefore for the purpose of imparting light resistance, which is a property that can prevent discoloration/deterioration of the display device due to the ultraviolet rays, a coat layer containing an ultraviolet ray absorber may be provided on the surface side of the above-described cover material opposite to the display device.

PRIOR ART DOCUMENTS

Patent Documents

[Patent Document 1] JP2004-237799A
[Patent Document 2] JP2004-268675A

SUMMARY OF THE INVENTION

Problems to be Solved by the Invention

However, to produce an electronic license plate provided with the above-described coat layer, it is necessary to provide a step of forming the coat layer, which may cause a problem in that the production cost increases.

In addition, the electronic license plate is left outdoors for a long period of time in a state of being attached to the exterior of a vehicle and may thus be exposed to high temperature and high humidity conditions. Under such high temperature and high humidity conditions, outgassing may occur from a resin member constituting the cover material or the display device, and the gas may stay at the interface between the cover material and the adhesive layer or the interface between the adhesive layer and the display device to cause blisters such as air bubbles, floating, and delamination.

The present invention has been made in consideration of such actual circumstances and objects of the present invention include providing an adhesive sheet that can achieve both the light resistance and the blister resistance satisfactorily, providing a structural body that achieves both the light resistance and the blister resistance satisfactorily, and providing a method of producing the structural body.

Means for Solving the Problems

To achieve the above objects, first, the present invention provides an adhesive sheet comprising an adhesive layer composed of an adhesive having active energy ray curability and ultraviolet ray absorbability, wherein when one surface of the adhesive layer is irradiated with ultraviolet rays having a light amount of 2000 $mJ/cm^2$ to cure the adhesive layer and an infrared absorption spectrum is then measured by a total reflection measurement method for each of an irradiated surface that is a surface of the cured adhesive layer irradiated with the ultraviolet rays and a non-irradiated surface that is opposite to the irradiated surface, a maximum value of an absolute value of absorbance is 0.0001 or more and 0.012 or less within a wavenumber range of 700 to 1000 $cm^{-1}$ in a difference spectrum obtained by subtracting the infrared absorption spectrum of the non-irradiated surface from the infrared absorption spectrum of the irradiated surface, and when the adhesive layer is irradiated with ultraviolet rays having a light amount of 2000 $mJ/cm^2$ to cure the adhesive layer, a difference in a gel fraction of the adhesive constituting the adhesive layer before and after the irradiation is 5 points or more and 50 points or less (Invention 1).

In the adhesive sheet according to the above invention (Invention 1), the adhesive layer is composed of the adhesive having ultraviolet ray absorbability, and satisfactory light resistance can thereby be achieved without the need to provide a coat layer separately. Moreover, the adhesive layer is composed of the adhesive which has the active energy ray curability and satisfies the above-described condition for the difference spectrum; therefore, even though the adhesive has the ultraviolet ray absorbability, when the adhesive layer is irradiated with active energy rays after bonding the structural members together, the adhesive layer can be cured satisfactorily and can exhibit suitable cohesiveness, and both the active energy ray irradiated surface and non-irradiated surface of the adhesive layer can exhibit suitable interfacial adhesion. In particular, the difference in the gel fraction of the adhesive layer before and after irradiation with the active energy rays falls within the above range, and the interfacial adhesion can thereby be further improved. As a result, excellent blister resistance can be achieved.

In the above invention (Invention 1), the adhesive layer may preferably have a thickness of 20 μm or more and 1000 μm or less (Invention 2).

In the above invention (Invention 1, 2), when the adhesive layer is irradiated with ultraviolet rays having a light amount of 2000 $mJ/cm^2$ to cure the adhesive layer, the gel fraction of the adhesive constituting the cured adhesive layer may be preferably 40% or more and 95% or less (Invention 3).

In the above invention (Invention 1 to 3), when the adhesive layer is irradiated with ultraviolet rays having a light amount of 2000 $mJ/cm^2$ to cure the adhesive layer, the cured adhesive layer may preferably have a storage elastic modulus of 0.03 MPa or more and 2.00 MPa or less at 23° C. (Invention 4).

In the above invention (Invention 1 to 4), the adhesive constituting the adhesive layer may preferably have a crosslinked structure composed of a (meth)acrylic ester polymer and a crosslinker and contain an active energy ray curable component and an ultraviolet ray absorber (Invention 5).

In the above invention (Invention 5), the adhesive constituting the adhesive layer may preferably contain a photopolymerization initiator (Invention 6).

In the above invention (Invention 1 to 6), the adhesive sheet may preferably comprise: two release sheets; and the adhesive layer interposed between the two release sheets so as to be in contact with release surfaces of the two release sheets (Invention 7).

Second, the present invention provides a structural body comprising: a first structural member; a second structural member; and a cured adhesive layer that bonds the first structural member and the second structural member together, wherein the cured adhesive layer is obtained by curing the adhesive layer of the adhesive sheet (Invention 1 to 7) (Invention 8).

In the above invention (Invention 8), at least one of the first structural member and the second structural member has a surface in contact with the cured adhesive layer, and the surface may be preferably provided by a resin material (Invention 9).

In the above invention (Invention 8, 9), the first structural member may be preferably a cover material, the second structural member may be preferably a display device, and the structural body may be preferably a display body attached to an exterior of a moving object (Invention 10).

In the above invention (Invention 10), the moving object may be preferably a vehicle (Invention 11).

Third, the present invention provides a method of producing the structural body (Invention 8 to 11), comprising: a bonding step of bonding the first structural member and the second structural member together by the adhesive layer of the adhesive sheet (Invention 1 to 7); and an irradiation step of irradiating the adhesive layer after the bonding with active energy rays via at least one of the first structural member and the second structural member to cure the adhesive layer to obtain the cured adhesive layer (Invention 12).

Advantageous Effect of the Invention

The adhesive sheet according to the present invention can satisfactorily achieve both the light resistance and the blister resistance, and the structural body according to the present invention can satisfactorily achieve the light resistance and the blister resistance.

BRIEF DESCRIPTION OF DRAWINGS

FIG. 1 is a cross-sectional view of an adhesive sheet according to an embodiment of the present invention.

FIG. 2 is a cross-sectional view of a structural body according to an embodiment of the present invention.

EMBODIMENTS FOR CARRYING OUT THE INVENTION

Hereinafter, one or more embodiments of the present invention will be described.

<Adhesive Sheet>

The adhesive sheet according to the present embodiment is an adhesive sheet that includes at least an adhesive layer composed of an adhesive having active energy ray curability and ultraviolet ray absorbability, and may be preferably a pressure sensitive adhesive sheet in which a release sheet is laminated on one surface of the pressure sensitive adhesive layer or release sheets are laminated on both surfaces of the pressure sensitive adhesive layer.

FIG. 1 illustrates a specific configuration as an example of the adhesive sheet according to the present embodiment.

As illustrated in FIG. 1, the adhesive sheet 1 according to the embodiment is composed of two release sheets 12a and 12b and an adhesive layer 11 interposed between the two release sheets 12a and 12b so as to be in contact with release surfaces of the two release sheets 12a and 12b. The release surface of a release sheet in the present specification refers to a surface having releasability in the release sheet, and examples of the release surface include both a surface subjected to release treatment and a surface that exhibits releasability even without being subjected to release treatment.

The adhesive sheet 1 according to the present embodiment can be used for production of a structural body as illustrated in FIG. 2. In this case, for example, after obtaining a laminate of a first structural member 21 (one structural member), the adhesive layer 11 of the adhesive sheet 1, and a second structural member 22 (the other structural member), the adhesive layer 11 may be irradiated with active energy rays. This allows the adhesive layer 11 to be cured to become a cured adhesive layer 11', and the structural body 2 is obtained in which the first structural member 21, the cured adhesive layer 11', and the second structural member 22 are laminated in this order.

In the above cured adhesive layer 11', the gel fraction and the cohesive force increase due to the curing, and both the active energy ray irradiated surface and non-irradiated surface of the cured adhesive layer 11' exhibit satisfactory interface adhesion. Therefore, even when the obtained structural body 2 is left, for example, for 72 hours under severe conditions such as a low-temperature condition of −40° C., a high-temperature condition of 95° C., and a high-temperature and high-humidity condition of 85° C. and 85% RH, the occurrence of bubbles, floating, delamination, or the like at the interface between the cured adhesive layer 11' and the structural members is suppressed, and excellent blister resistance is exhibited.

1. Physical Properties of Adhesive Sheet (1) Condition for Difference Spectrum

In the adhesive sheet 1 according to the present embodiment, when one surface of the adhesive layer is irradiated with ultraviolet rays having a light amount of mJ/cm2 to cure the adhesive layer using the adhesive constituting the adhesive layer 11 and an infrared absorption spectrum is then measured by a total reflection measurement method for each of an irradiated surface that is a surface of the cured adhesive layer irradiated with the ultraviolet rays and a non-irradiated surface that is opposite to the irradiated surface, the maximum value of the absolute value of absorbance is 0.0001 or more and 0.012 or less within a wavenumber range of 700 to 1000 cm$^{-1}$ in a difference spectrum obtained by subtracting the infrared absorption spectrum of the non-irradiated surface from the infrared absorption spectrum of the irradiated surface.

As described above, the adhesive layer 11 in the present embodiment is composed of an adhesive having active energy ray curability and can be cured by being irradiated with active energy rays. Here, the adhesive constituting the adhesive layer 11 has ultraviolet ray absorbability, and it has been considered that such an adhesive is difficult to develop excellent blister resistance and light resistance because when irradiated with active energy rays (in particular, ultraviolet rays), the adhesive absorbs the active energy rays, so that the adhesive layer is not cured at all or there is a difference in the degree of curing between the active energy ray irradiated surface and the non-irradiated surface, thus resulting in the insufficient curing of the adhesive. However, fortunately, the present inventors have paid attention to the above-described difference spectrum and found that, by using an adhesive that satisfies the above-described condition for the difference spectrum, even though the adhesive has ultraviolet ray absorbability, the adhesive layer can be sufficiently cured to develop excellent blister resistance and light resistance without being irradiated with excessive active energy rays.

In the adhesive sheet 1 of the present embodiment, by satisfying the above-described condition for the difference spectrum, the adhesive layer 11 is irradiated with the active energy rays so as to be satisfactorily cured with an even degree of curing in the thickness direction and can develop excellent cohesiveness even though the adhesive constituting the adhesive layer 11 has ultraviolet ray absorbability. Moreover, both the active energy ray irradiated surface and non-irradiated surface of the adhesive layer develop suitable interfacial adhesion. These make it possible to exhibit excellent blister resistance. Furthermore, the adhesive constituting the adhesive layer 11 has ultraviolet ray absorbability, and the cured adhesive layer 11' formed by curing the adhesive layer 11 can thereby achieve satisfactory light resistance without separately providing a coat layer for cutting off the ultraviolet rays for the produced structural body 2. Thus, the adhesive sheet 1 in the present embodiment can satisfactorily achieve both the excellent blister resistance and the excellent light resistance.

From such a viewpoint, the maximum value of the absolute value of absorbance in the above-described difference spectrum may be preferably 0.010 or less and particularly preferably 0.008 or less. The lower limit of the above maximum value is not particularly limited and may be, for example, 0.0005 or more and particularly 0.0010 or more.

Additionally or alternatively, in the adhesive sheet 1 according to the present embodiment, the previously described maximum value regarding the difference spectrum measured in the same manner as in the case of a light amount of 2000 mJ/cm$^2$ except that the light amount of ultraviolet rays for irradiation is 200 mJ/cm$^2$ may be preferably 0.0001 or more, more preferably 0.0005 or more, particularly preferably 0.001 or more, and further preferably 0.005 or more. From another aspect, the maximum value may be preferably 0.100 or less, more preferably 0.080 or less, particularly preferably 0.050 or less, and further preferably 0.040 or less. When the maximum value in the case of a light amount of 200 mJ/cm$^2$ is within such a range, it is easy to satisfy the condition for the difference spectrum in the case of a light amount of 2000 mJ/cm$^2$.

Additionally or alternatively, in the adhesive sheet 1 according to the present embodiment, the previously described maximum value regarding the difference spectrum measured in the same manner as in the case of a light amount of 2000 mJ/cm$^2$ except that the light amount of ultraviolet rays for irradiation is 1000 mJ/cm$^2$ may be preferably 0.0001 or more, particularly preferably 0.0005 or more, and further preferably 0.001 or more. From another aspect, the maximum value may be preferably 0.050 or less, more preferably 0.030 or less, particularly preferably 0.020 or less, and further preferably 0.010 or less. When the maximum value in the case of a light amount of 1000 mJ/cm$^2$ is within such a range, it is easy to satisfy the condition for the difference spectrum in the case of a light amount of 2000 mJ/cm$^2$.

Details of the measurement method for each of the above difference spectra are as described in the Testing Example, which will be described later.

(2) Gel Fraction

In the adhesive sheet 1 according to the present embodiment, when the adhesive layer 11 is irradiated with ultraviolet rays having a light amount of 2000 mJ/cm$^2$ to cure the adhesive layer 11, the difference in a gel fraction of the adhesive constituting the adhesive layer 11 before and after the irradiation is 5 points or more. When the difference in the gel fraction before and after the irradiation is 5 points or more, the cohesive force of the cured adhesive layer 11' is sufficiently high, and the cured adhesive layer 11' exhibits satisfactory interfacial adhesion to an adherend. As a result, excellent blister resistance is exhibited even when the structural body 2 comprising the cured adhesive layer 11' and one or more structural members is placed under a high-temperature and high-humidity condition.

From such a viewpoint, the above difference in the gel fraction may be preferably 8 points or more, particularly preferably 10 points or more, and further preferably 12 points or more. The upper limit of the above gel fraction may be preferably 50 points or less, more preferably 40 points or less, particularly preferably 30 points or less, and further preferably 20 points or less from the viewpoint that the adhesive strength and storage elastic modulus described later are likely to be within predetermined ranges.

In general, the above-described difference in the gel fraction can be used as an index of the active energy ray curability of the adhesive layer. That is, those in which a predetermined difference occurs in the above-described gel fraction can be determined to have the active energy ray curability while those in which the predetermined difference does not occur can be determined to have no active energy ray curability. The adhesive layer 11 in the present embodiment can be said to have the active energy ray curability, for example, when the above-described difference in the gel fraction is 5 points or more.

In the adhesive sheet 1 according to the present embodiment, the gel fraction of the adhesive (the adhesive before being cured by irradiation with active energy rays) constituting the adhesive layer 11 may be preferably 20% or more, particularly preferably 30% or more, and further preferably 38% or more. From another aspect, the above gel fraction may be preferably 90% or less, more preferably 80% or less, particularly preferably 70% or less, further preferably 60% or less, and most preferably 53% or less. When the above gel fraction is within these ranges, it is easy to satisfy the condition for the difference spectrum when the light amount is 2000 mJ/cm$^2$ and the previously described difference in the gel fraction. Moreover, the bonding properties to an adherend (following properties at the time of bonding, etc.) are satisfactory, and the interfacial adhesion to an adherend is likely to be improved. This allows the excellent blister resistance to be readily exhibited.

Additionally or alternatively, in the adhesive sheet 1 according to the present embodiment, when the adhesive layer 11 is irradiated with ultraviolet rays having a light amount of 200 mJ/cm$^2$ to cure the adhesive layer 11, the gel fraction of the adhesive constituting the cured adhesive layer 11' thus obtained may be preferably 30% or more, particularly preferably 35% or more, and further preferably 40% or more. From another aspect, the above gel fraction may be preferably 95% or less, more preferably 85% or less, particularly preferably 75% or less, and further preferably 65% or less. When the gel fraction in the case of a light amount of 200 mJ/cm$^2$ is within these ranges, it is easy to satisfy the conditions for the difference spectrum in the cases of a light amount of 200 mJ/cm$^2$ and a light amount of mJ/cm$^2$.

Moreover, the obtained cured adhesive layer 11' is likely to develop suitable cohesiveness and readily exhibits the blister resistance.

Additionally or alternatively, in the adhesive sheet 1 according to the present embodiment, when the adhesive layer 11 is irradiated with ultraviolet rays having a light amount of 1000 mJ/cm$^2$ to cure the adhesive layer 11, the gel fraction of the adhesive constituting the cured adhesive layer 11' thus obtained may be preferably 40% or more, more preferably 45% or more, particularly preferably 50% or more, and further preferably 55% or more. From another aspect, the above gel fraction may be preferably 95% or less, more preferably 90% or less, particularly preferably 85% or less, and further preferably 75% or less. When the gel fraction in the case of a light amount of 1000 mJ/cm$^2$ is within these ranges, it is easy to satisfy the conditions for the difference spectrum in the cases of a light amount of 1000 mJ/cm$^2$ and a light amount of 2000 mJ/cm$^2$. Moreover, the obtained cured adhesive layer 11' is likely to develop suitable cohesiveness and readily exhibits the blister resistance.

Additionally or alternatively, in the adhesive sheet 1 according to the present embodiment, when the adhesive layer 11 is irradiated with ultraviolet rays having a light amount of 2000 mJ/cm$^2$ to cure the adhesive layer 11, the gel fraction of the adhesive constituting the cured adhesive layer 11' thus obtained may be preferably 40% or more, more preferably 45% or more, particularly preferably 50% or more, further preferably 55% or more, and most preferably 58% or more. From another aspect, the above gel fraction may be preferably 95% or less, particularly preferably 90% or less, and further preferably 85% or less. When the gel fraction in the case of a light amount of 2000 mJ/cm$^2$ is within these ranges, it is easy to satisfy the condition for the difference spectrum in the case of a light amount of 2000 mJ/cm$^2$ and the previously described difference in the gel fraction. Moreover, the obtained cured adhesive layer 11' is likely to develop suitable cohesiveness thereby to readily exhibit the blister resistance.

Details of the measurement method for each of the above gel fractions are as described in the Testing Example, which will be described later.

(3) Storage Elastic Modulus

In the adhesive sheet 1 according to the present embodiment, the storage elastic modulus at 23° C. of the adhesive (the adhesive before being cured by irradiation with active energy rays) constituting the adhesive layer 11 may be preferably 0.01 MPa or more, more preferably 0.03 MPa or more, particularly preferably 0.05 MPa or more, and further preferably 0.07 MPa or more. From the viewpoint of the blister resistance, the above storage elastic modulus at 23° C. may be specifically preferably 0.08 MPa or more. From another aspect, the above storage elastic modulus at 23° C. may be preferably 1.00 MPa or less, more preferably 0.50 MPa or less, particularly preferably 0.20 MPa or less, and further preferably 0.10 MPa or less. When the storage elastic modulus at 23° C. of the adhesive constituting the adhesive layer 11 is within these ranges, it is easy to satisfy the condition for the difference spectrum in the case of a light amount of 2000 mJ/cm$^2$. Moreover, the bonding properties to an adherend (following properties at the time of bonding, etc.) are satisfactory, and the interfacial adhesion to an adherend is likely to be improved. This allows the excellent blister resistance to be readily exhibited.

Additionally or alternatively, in the adhesive sheet 1 according to the present embodiment, when the adhesive layer 11 is irradiated with ultraviolet rays having a light amount of 2000 mJ/cm$^2$ to cure the adhesive layer 11, the storage elastic modulus at 23° C. of the adhesive constituting the cured adhesive layer 11' thus obtained may be preferably 0.03 MPa or more, particularly preferably 0.05 MPa or more, and further preferably 0.08 MPa or more. From the viewpoint of improving the adhesive strength, the above storage elastic modulus at 23° C. may be preferably 0.12 MPa or more, more preferably 0.15 MPa or more, particularly preferably 0.20 MPa or more, and further preferably 0.25 MPa or more. From the viewpoint of blister resistance, the above storage elastic modulus at 23° C. may be most preferably 0.26 MPa or more. From another aspect, the above storage elastic modulus at 23° C. may be preferably 2.00 MPa or less, particularly preferably 1.00 MPa or less, and further preferably 0.50 MPa or less. When the storage elastic modulus at 23° C. in the case of a light amount of mJ/cm$^2$ is within these ranges, it is easy to satisfy the condition for the difference spectrum in the case of a light amount of 2000 mJ/cm$^2$.

Details of the measurement method for each of the above storage elastic moduli are as described in the Testing Example, which will be described later.

(4) Transmittance

In the adhesive layer 11 of the present embodiment, the transmittance of light rays having a wavelength of 360 nm may be preferably 20% or less, particularly preferably 10% or less, further preferably 5% or less, and most preferably 1% or less. When the transmittance of light rays having a wavelength of 360 nm is within the above range, the adhesive layer 11 in the present embodiment is likely to exhibit excellent ultraviolet ray absorbability, and the structural body 2 produced by using the adhesive sheet 1 according to the present embodiment has more excellent light resistance. The lower limit of the transmittance of light rays having a wavelength of 360 nm is not particularly limited and may be, for example, 0% or more, 0.01% or more, particularly 0.10% or more, and further 0.50% or more.

Additionally or alternatively, in the adhesive layer of the present embodiment, the transmittance of light rays having a wavelength of 380 nm may be preferably 50% or less, preferably 30% or less, particularly preferably 20% or less, preferably 10% or less, and most preferably 1% or less. When the transmittance of light rays having a wavelength of 380 nm is within the above range, the adhesive layer 11 in the present embodiment is likely to exhibit excellent ultraviolet ray absorbability, and the structural body 2 produced by using the adhesive sheet 1 according to the present embodiment has more excellent light resistance. The lower limit of the transmittance of light rays having a wavelength of 380 nm is not particularly limited and may be, for example, 0% or more, 0.01% or more, particularly 0.1% or more, and further 0.50% or more.

Additionally or alternatively, in the adhesive layer of the present embodiment, the transmittance of light rays having a wavelength of 400 nm may be preferably 70% or less, more preferably 50% or less, particularly preferably 30% or less, and further preferably 21% or less. When the transmittance of light rays having a wavelength of 400 nm is within the above range, the adhesive layer 11 in the present embodiment is likely to exhibit excellent ultraviolet ray absorbability, and the structural body 2 produced by using the adhesive sheet 1 according to the present embodiment has more excellent light resistance. The lower limit of the transmittance of light rays having a wavelength of 400 nm is not particularly limited and may be, for example, 0% or more, 1% or more, particularly 5% or more, and further 10% or more.

Details of the measurement method for each of the above transmittances are as described in the Testing Example, which will be described later.

(5) Adhesive Strength

In the adhesive sheet 1 according to the present embodiment, the adhesive strength to a soda-lime glass (the adhesive strength before the adhesive layer 11 is cured by irradiation with ultraviolet rays) may be preferably 1 N/25 mm or more, more preferably 5 N/25 mm or more, particularly preferably 10 N/25 mm or more, further preferably 20 N/25 mm or more, and most preferably 28 N/25 mm or more. When the above adhesive strength is 1 N/25 mm or more, the bonding properties to an adherend are satisfactory so as to allow excellent interfacial adhesion to be readily exhibited, and more excellent blister resistance is readily exhibited. On the other hand, the upper limit of the adhesive strength is not particularly limited and may be, for example, 100 N/25 mm or less, 80 N/25 mm or less, particularly 60 N/25 mm or less, and further 50 N/25 mm or less.

Additionally or alternatively, in the adhesive sheet 1 according to the present embodiment, when the adhesive layer 11 is irradiated with ultraviolet rays having a light amount of 2000 mJ/cm$^2$ to cure the adhesive layer 11, the adhesive strength to a soda-lime glass may be preferably 5 N/25 mm or more, more preferably 10 N/25 mm or more, particularly preferably 20 N/25 mm or more, preferably 35 N/25 mm or more, and most preferably 42 N/25 mm or more. When the above adhesive strength is 5 N/25 mm or more, more excellent blister resistance is exhibited. On the other hand, the upper limit of the above adhesive strength is not particularly limited and may be, for example, 100 N/25 mm or less, 80 N/25 mm or less, further 60 N/25 mm or less, and further 50 N/25 mm or less.

The above adhesive strength refers basically to a peel strength that is measured by using a method of 180° peeling in accordance with JIS 20237: 2009, and a specific testing method is as described in the Testing Example, which will be described later.

2. Configuration of Adhesive Sheet (1) Adhesive Layer

The adhesive layer 11 is not particularly limited, provided that it is composed of an adhesive having active energy ray curability and ultraviolet ray absorbability and the adhesive satisfies the previously described condition for the difference spectrum. In particular, the adhesive layer 11 may preferably have a crosslinked structure composed of a (meth)acrylic ester polymer (A) and a crosslinker (B) and contain an active energy ray curable component (C) and an ultraviolet ray absorber (E). Such an adhesive layer 11 can be composed of a pressure sensitive adhesive obtained, for example, by crosslinking (thermally crosslinking) a pressure sensitive adhesive composition that contains the (meth)acrylic ester polymer (A), the crosslinker (B), the active energy ray curable component (C), and the ultraviolet ray absorber (E)(this composition may be referred to as an "adhesive composition P," hereinafter). The adhesive composition P may preferably further contain a photopolymerization initiator (D), if desired. As used in the present specification, the term "(meth)acrylic acid" refers to both the acrylic acid and the methacrylic acid. The same applies to other similar terms. As used in the present specification, the term "polymer" encompasses the concept of a "copolymer."

The adhesive layer 11 obtained by crosslinking (thermally crosslinking) the above-described adhesive composition P is still not cured by active energy rays and has a relatively low storage elastic modulus at the stage of the adhesive sheet 1, that is, the stage before being bonded to an adherend, and it is therefore possible to relax the stress generated when the adhesive layer 11 is bonded to an adherend. Accordingly, even when the adhesive layer 11 is bonded to a surface having irregularities on the adherend, the adhesive layer 11 readily follows the irregularities and exhibits excellent bonding properties to the adherend because gaps, floating, etc. are prevented from occurring in the vicinity of the irregularities. Moreover, the gel fraction is relatively low in the stage before the adhesive layer 11 is bonded to an adherend, and therefore when the adhesive layer 11 is bonded to the adherend, the uncured component is likely to wet and spread on the surface of the adherend due to the plastic action of the uncured component so that the adhesive layer 11 exhibits excellent interfacial adhesion. Thus, the bonding properties and interfacial adhesion to the adherend synergistically serve to improve the blister resistance.

(1-1) (Meth)Acrylic Ester Polymer (A)

The (meth)acrylic ester polymer (A) may preferably contain (meth)acrylic alkyl ester and a monomer having a reactive functional group in the molecule (reactive functional group-containing monomer), as the monomer unit which constitutes the polymer.

The (meth)acrylic ester polymer (A) can exhibit preferred adhesive properties by containing the (meth)acrylic alkyl ester as the monomer unit which constitutes the polymer. Preferred (meth)acrylic alkyl ester may be (meth)acrylic alkyl ester whose carbon number of alkyl group is 1 to 20. The alkyl group may be linear or branched or may have a cyclic structure.

Examples of the (meth)acrylic alkyl ester whose carbon number of alkyl group is 1 to 20 include methyl (meth)acrylate, ethyl (meth)acrylate, propyl (meth)acrylate, n-butyl (meth)acrylate, n-pentyl (meth)acrylate, n-hexyl (meth)acrylate, 2-ethylhexyl (meth)acrylate, isooctyl (meth)acrylate, n-decyl (meth)acrylate, n-dodecyl (meth)acrylate, myristyl (meth)acrylate, palmityl (meth)acrylate, stearyl (meth)acrylate, cyclohexyl (meth)acrylate, isobornyl (meth)acrylate, and adamantyl (meth)acrylate. These may each be used alone or two or more types may also be used in combination.

Among the above, (meth)acrylic alkyl ester whose carbon number of alkyl group is 4 to 20 may be preferred as the (meth)acrylic alkyl ester from the viewpoint of blister resistance. Preferred examples of the (meth)acrylic alkyl ester whose carbon number of alkyl group is 4 to 20 include n-butyl (meth)acrylate, 2-ethylhexyl (meth)acrylate, isooctyl (meth)acrylate, and isobornyl (meth)acrylate, among which n-butyl (meth)acrylate, 2-ethylhexyl (meth)acrylate, and isobornyl (meth)acrylate may be preferred because excellent adhesive properties and blister resistance can be obtained, and n-butyl acrylate, 2-ethylhexyl acrylate, and isobornyl acrylate may be particularly preferred.

The (meth)acrylic ester polymer (A) may preferably contain 40 mass % or more, more preferably 50 mass % or more, particularly preferably 60 mass % or more, and further preferably 70 mass % or more of the (meth)acrylic alkyl ester as the monomer unit which constitutes the polymer. When 40 mass % or more of the above (meth)acrylic alkyl ester is contained, the (meth)acrylic ester polymer (A) can exhibit suitable adhesive properties. From another aspect, the (meth)acrylic ester polymer (A) may preferably contain mass % or less, particularly preferably 95 mass % or less, and further preferably 90 mass % or less of the (meth)acrylic alkyl ester as the monomer unit which constitutes the polymer. In particular, when the (meth)acrylic ester polymer (A) contains a hydroxyl group-containing monomer as the monomer which constitutes the polymer, the (meth)acrylic ester polymer (A) may preferably contain 85 mass % or less, particularly preferably 80 mass % or less, and further preferably 75 mass % or less of the (meth)acrylic alkyl ester as the monomer unit which constitutes the polymer. When the content of the above (meth)acrylic alkyl ester is 99 mass % or less, an appropriate amount of other monomer components can be introduced into the (meth)acrylic ester polymer (A).

When containing a reactive functional group-containing monomer as the monomer unit which constitutes the polymer, the (meth)acrylic ester polymer (A) reacts with the crosslinker (B), which will be described late, via the reactive functional group derived from the reactive functional group-containing monomer, thereby forming a crosslinked structure (three-dimensional network structure), and an adhesive having desired cohesive force can be obtained.

Preferred examples of the reactive functional group-containing monomer contained in the (meth)acrylic ester polymer (A) as the monomer unit which constitutes the polymer include a monomer having a hydroxyl group in the molecule (hydroxyl group-containing monomer), a monomer having a carboxy group in the molecule (carboxy group-containing monomer), and a monomer having an amino group in the molecule (amino group-containing monomer). These reactive functional group-containing monomers may each be used alone or two or more types may also be used in combination.

Among the above reactive functional group-containing monomers, the hydroxyl group-containing monomer or the carboxy group-containing monomer may be preferred from the viewpoint of easily adjusting the crosslink density and easily obtaining an adhesive having desired cohesive force, and the hydroxyl group-containing monomer may be preferred from the viewpoint of adhesive strength.

Examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth) acrylate. Among the above, hydroxyalkyl (meth)acrylate having a hydroxyalkyl group whose carbon number is 1 to 4 may be preferred. Specifically, for example, 2-hydroxyethyl (meth)acrylate, 4-hydroxybutyl (meth)acrylate, etc. may be preferred. In particular, 2-hydroxyethyl acrylate or 4-hydroxybutyl acrylate may be preferred. These may each be used alone or two or more types may also be used in combination.

Examples of the carboxy group-containing monomer include ethylenically unsaturated carboxylic acids such as acrylic acid, methacrylic acid, crotonic acid, maleic acid, itaconic acid, and citraconic acid. Among these, acrylic acid may be preferred from the viewpoint of the cohesive force of the obtained (meth)acrylic ester polymer (A). These may each be used alone or two or more types may also be used in combination.

The (meth)acrylic ester polymer (A) may preferably contain 1 mass % or more, particularly preferably 3 mass % or more, and further preferably 5 mass % or more of the reactive functional group-containing monomer as the monomer unit which constitutes the polymer. When the reactive functional group-containing monomer is a hydroxyl group-containing monomer, the (meth)acrylic ester polymer (A) may preferably contain 10 mass % or more, particularly preferably 18 mass % or more, and further preferably 24 mass % or more of the hydroxyl group-containing monomer as the monomer unit which constitutes the polymer. From another aspect, the (meth)acrylic ester polymer (A) may preferably contain 50 mass % or less, particularly preferably 40 mass % or less, and further preferably 30 mass % or less of the reactive functional group-containing monomer as the monomer unit which constitutes the polymer. When the reactive functional group-containing monomer is a carboxy group-containing monomer, the (meth)acrylic ester polymer (A) may preferably contain 20 mass % or less, particularly preferably 15 mass % or less, and further preferably 10 mass % or less of the carboxy group-containing monomer.

Additionally or alternatively, the (meth)acrylic ester polymer (A) may preferably contain a nitrogen atom-containing monomer as the monomer unit which constitutes the polymer. By allowing a nitrogen atom-containing monomer to exist in the polymer as a constituent unit, the adhesive is imparted with a predetermined polarity and can have excellent affinity even for an adherend having a certain degree of polarity, such as glass. Examples of the above nitrogen atom-containing monomer include a monomer having an amide group and a monomer having a nitrogen-containing heterocycle in addition to the amino group-containing monomer as the previously described reactive functional group-containing monomer, among which a monomer having a nitrogen-containing heterocycle may be preferred from the viewpoint of imparting appropriate rigidity to the (meth) acrylic ester polymer (A).

Examples of the monomer having a nitrogen-containing heterocycle include N-(meth)acryloyl morpholine, N-vinyl-2-pyrrolidone, N-(meth)acryloyl pyrrolidone, N-(meth) acryloyl piperidin, N-(meth)acryloyl pyrrolidine, N-(meth) acryloyl aziridine, aziridinyl ethyl (meth)acrylate, 2-vinylpyridine, 4-vinylpyridine, 2-vinylpyrazine, 1-vinylimidazole, N-vinylcarbazole, and N-vinylphthalimide, among which N-(meth)acryloylmorpholine, which exhibits more excellent adhesive strength, may be preferred, and N-acryloylmorpholine may be particularly preferred.

As the nitrogen atom-containing monomer, for example, N-vinylcarboxylic acid amide, (meth)acrylamide, N-methyl (meth)acrylamide, N-methylol (meth)acrylamide, N-tert-butyl (meth)acrylamide, N,N-dimethyl (meth)acrylamide, N,N-ethyl (meth)acrylamide, N,N-dimethylaminopropyl (meth)acrylamide, N-isopropyl (meth)acrylamide, N-phenyl (meth)acrylamide, dimethylaminopropyl (meth)acrylamide, N-vinylcaprolactam, etc. can also be used.

The above nitrogen atom-containing monomers may each be used alone or two or more types may also be used in combination.

When containing a nitrogen atom-containing monomer as the monomer unit which constitutes the polymer, the (meth) acrylic ester polymer (A) may preferably contain 0.5 mass % or more, particularly preferably 1 mass % or more, and further preferably 3 mass % or more of the nitrogen atom-containing monomer as the monomer unit which constitutes the polymer. From another aspect, the (meth)acrylic ester polymer (A) may preferably contain 20 mass % or less, particularly preferably 15 mass % or less, and further preferably 8 mass % or less of the nitrogen atom-containing monomer as the monomer unit which constitutes the polymer. When the content of the nitrogen atom-containing monomer is within the above range, the obtained adhesive can effectively exhibit excellent adhesive properties to an adherend such as glass. Moreover, the previously described gel fraction and storage elastic modulus can be easily adjusted to suitable values.

The (meth)acrylic ester polymer (A) may contain other monomers, if desired, as the monomer unit which constitutes the polymer. Examples of other monomers include alkoxyalkyl (meth)acrylates such as methoxyethyl (meth)acrylate and ethoxyethyl (meth)acrylate, vinyl acetate, and styrene. These may each be used alone or two or more types may also be used in combination.

The (meth)acrylic ester polymer (A) may be preferably a linear polymer. Such a linear polymer may promote the entanglement of molecular chains, and improvement in the cohesive force can be expected; therefore, an adhesive having more excellent blister resistance can be obtained.

The (meth)acrylic ester polymer (A) may be preferably a solution polymerization product obtained by a solution polymerization method. Being a solution polymerization product allows a high molecular-weight polymer to be easily obtained, and improvement in the cohesive force can be expected; therefore, an adhesive having more excellent blister resistance can be obtained.

The polymerization form of the (meth)acrylic ester polymer (A) may be a random copolymer or may also be a block copolymer.

The weight-average molecular weight of the (meth)acrylic ester polymer (A) may be preferably 200,000 or more, particularly preferably 300,000 or more, and further preferably 400,000 or more as the lower limit. When the lower limit of the weight-average molecular weight of the (meth)acrylic ester polymer (A) satisfies the above, it is easy to adjust the previously described gel fraction and storage elastic modulus to appropriate values, and the blister resistance of the obtained adhesive can be more excellent.

From another aspect, the weight-average molecular weight of the (meth)acrylic ester polymer (A) may be preferably 2,000,000 or less, more preferably 1,500,000 or less, particularly preferably 1,000,000 or less, and further preferably 800,000 or less as the upper limit. When the upper limit of the weight-average molecular weight of the (meth)acrylic ester polymer (A) satisfies the above, the bonding properties and interfacial adhesion of the obtained adhesive to an adherend are more excellent. Moreover, it is easy to adjust the previously described gel fraction and storage elastic modulus to appropriate values. As used in the present specification, the weight-average molecular weight refers to a standard polystyrene equivalent value that is measured by using a gel permeation chromatography (GPC) method.

In the adhesive composition P, one type of the (meth)acrylic ester polymer (A) may be used alone or two or more types may also be used in combination.

(1-2) Crosslinker (B)

The crosslinker (B) can crosslink the (meth)acrylic ester polymer (A) by heating the adhesive composition P and can satisfactorily form a three-dimensional network structure. This allows the obtained adhesive to have more improved cohesive force and more excellent blister resistance.

It suffices that the above crosslinker (B) is reactive with a reactive functional group of the (meth)acrylic ester polymer (A). Examples of the crosslinker (B) include an isocyanate-based crosslinker, an epoxy-based crosslinker, an amine-based crosslinker, a melamine-based crosslinker, an aziridine-based crosslinker, a hydrazine-based crosslinker, an aldehyde-based crosslinker, an oxazoline-based crosslinker, a metal alkoxide-based crosslinker, a metal chelate-based crosslinker, a metal salt-based crosslinker, and an ammonium salt-based crosslinker. When the reactive group of the (meth)acrylic ester polymer (A) is a hydroxyl group, it may be preferred to use, among the above, the isocyanate-based crosslinker having excellent reactivity with the hydroxyl group, and when the reactive group of the (meth)acrylic ester polymer (A) is a carboxy group, it may be preferred to use, among the above, the epoxy-based crosslinker having excellent reactivity with the carboxy group. One type of the crosslinker (B) may be used alone or two or more types may also be used in combination.

The isocyanate-based crosslinker contains at least a polyisocyanate compound. Examples of the polyisocyanate compound include aromatic polyisocyanates such as tolylene diisocyanate, diphenylmethane diisocyanate and xylylene diisocyanate, aliphatic polyisocyanates such as hexamethylene diisocyanate, alicyclic polyisocyanates such as isophorone diisocyanate and hydrogenated diphenylmethane diisocyanate, biuret bodies and isocyanurate bodies thereof, and adduct bodies that are reaction products with low molecular active hydrogen-containing compounds such as ethylene glycol, propylene glycol, neopentyl glycol, trimethylol propane, and castor oil. From the viewpoint of reactivity with hydroxyl groups, it may be preferred to use, among the above, trimethylolpropane-modified aromatic polyisocyanate, in particular one of trimethylolpropane-modified tolylene diisocyanate and trimethylolpropane-modified xylylene diisocyanate.

Examples of the epoxy-based crosslinker include 1,3-bis(N,N-diglycidylaminomethyl) cyclohexane, N,N,N',N'-tetraglycidyl-m-xylylenediamine, ethylene glycol diglycidyl ether, 1,6-hexandiol diglycidyl ether, trimethylolpropane diglycidyl ether, diglycidyl aniline, and diglycidyl amine. Among these, 1,3-bis(N,N-diglycidylaminomethyl) cyclohexane may be preferred from the viewpoint of reactivity with carboxy groups.

The content of the crosslinker (B) in the adhesive composition P may be preferably 0.01 mass parts or more, particularly preferably 0.05 mass parts or more, and further preferably 0.1 mass parts or more to 100 mass parts of the (meth)acrylic ester polymer (A). From another aspect, the content may be preferably 3 mass parts or less, particularly preferably 2 mass parts or less, and further preferably 1 mass part or less. When the content of the crosslinker (B) is within the above range, the degree of crosslinking is appropriate, and it is easy to adjust the previously described gel fraction and storage elastic modulus of the obtained adhesive; therefore, the blister resistance is more excellent.

(1-3) Active Energy Ray Curable Component (C)

When the adhesive composition P contains the active energy ray curable component (C), the adhesive obtained by crosslinking (thermally crosslinking) the adhesive composition P becomes an adhesive having active energy ray curability. In this adhesive, it is considered that molecules of the active energy ray curable component (C) are polymerized with one another due to the curing by irradiation with active energy rays after the bonding with an adherend and the polymerized active energy ray curable component (C) is entangled with the crosslinked structure (three-dimensional network structure) of the (meth)acrylic ester polymer (A). The adhesive having such a high-dimensional structure exhibits high cohesive force and high film strength and is therefore more excellent in the blister resistance.

The active energy ray curable component (C) is not particularly limited, provided that it can be cured by irradiation with active energy rays and can obtain the above effects, and may be any of a monomer, an oligomer, and a polymer or may also be a mixture thereof. Among these, a polyfunctional acrylate-based monomer may be preferred because the compatibility with the (meth)acrylic ester polymer (A) and the like is excellent.

Examples of the polyfunctional acrylate-based monomer include bifunctional ones such as tricyclodecanedimethanol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl) isocyanurate, allylated cyclohexyl di(meth)acrylate, ethoxylated bisphenol A diacrylate, and 9,9-bis [4-(2-acryloyloxyethoxy) phenyl] fluorene; trifunctional ones such as trimethylolpropane tri(meth)acrylate, dipentaerythritol tri(meth)acrylate, propionic acid-modified dipentaerythritol tri(meth)acrylate, pentaerythritol tri(meth) acrylate, propylene oxide-modified trimethylolpropane tri (meth)acrylate, tris(acryloxyethyl) isocyanurate, and ε-caprolactone-modified tris-(2-(meth)acryloxyethyl) isocyanurate; tetrafunctional ones such as diglycerin tetra(meth)acrylate and pentaerythritol tetra(meth)acrylate; pentafunctional ones such as propionic acid-modified dipentaerythritol penta(meth)acrylate; and hexafunctional ones such as dipentaerythritol hexa(meth)acrylate and caprolactone-modified dipentaerythritol hexa(meth)acrylate. From the blister resistance of the obtained adhesive, it may be preferred to use, among the above, at least one of the ε-caprolactone-modified tris-(2-(meth)acryloxyethyl) isocyanurate and the tricyclodecanedimethanol di(meth)acrylate. These may each be used alone or two or more types may also be used in combination. From the viewpoint of compatibility with the (meth)acrylic ester polymer (A), the polyfunctional acrylate-based monomer may preferably have a molecular weight of less than 1000.

The content of the active energy ray curable component (C) in the adhesive composition P may be preferably 1 mass part or more as the lower limit with respect to 100 mass parts of the (meth)acrylic ester polymer (A) from the viewpoint of easily setting the previously described gel fraction and storage elasticity of the obtained adhesive to desired values. From the viewpoint of easily satisfying the previously described condition for the difference spectrum and the previously described difference in the gel fraction, the above content may be preferably 2 mass parts or more, more preferably 3 mass parts or more, particularly preferably 5 mass parts or more, and further preferably 8 mass parts or more as the lower limit with respect to 100 mass parts of the (meth)acrylic ester polymer (A). On the other hand, from the viewpoints of preventing the active energy ray curable component (C) from phase-separating from the (meth) acrylic ester polymer (A) and easily setting the previously described gel fraction and storage elasticity to desired values, the above content may be preferably 50 mass parts or less, more preferably 30 mass parts or less, particularly preferably 20 mass parts or less, and further preferably 15 mass parts or less as the upper limit.

(1-4) Photopolymerization Initiator (D)

When ultraviolet rays are used as the active energy rays for curing the adhesive having active energy ray curability, the adhesive composition P may preferably further contain a photopolymerization initiator (D). By containing the photopolymerization initiator (D) in this way, the active energy ray curable component (C) can be efficiently polymerized, and the polymerization curing time and the irradiation amount of the active energy rays can be reduced. However, the peak region of the light absorption wavelength of the photopolymerization initiator (D) may be preferably different from the peak region of the light absorption wavelength of the ultraviolet ray absorber (E), which will be described later. In this case, irradiation with active energy rays having a wavelength for cleaving the photopolymerization initiator (D) allows the photopolymerization initiator (D) to be cleaved without any problem and without being hindered by the ultraviolet ray absorber (E). As a result, the curing reaction of the active energy ray curable component (C) proceeds satisfactorily, and the previously described condition for the difference spectrum and the previously described difference in the gel fraction are easily satisfied. The "peak region of the light absorption wavelength" in the present specification refers to a wavelength region in which the absorbance is 20% or more of the maximum absorbance.

Here, the active energy rays in the present embodiment may preferably have a substantial intensity of light emission in a wavelength region exceeding a wavelength of nm. The wavelength region may be preferably 380 to 450 nm and more preferably 390 to 410 nm. Additionally or alternatively, when the maximum light emission intensity at 365 nm or less (usually having the maximum peak intensity around 365 nm) is 100%, an intensity of 20% or more may preferably appear at least in a part of the above wavelength region.

The maximum absorption wavelength of the absorbance of the photopolymerization initiator (D) at a wavelength of to 500 nm in an acetonitrile solution having a concentration of 0.1 mass % may be preferably 350 nm or more, particularly preferably 370 nm or more, and further preferably 380 nm or more. When there is a plurality of maximum absorption wavelengths of the absorbance at a wavelength of 200 to 500 nm, it suffices that at least one maximum absorption wavelength is within the above range. In this case, irradiation with the above active energy rays allows the photopolymerization initiator (D) to be cleaved without any problem and without being hindered by the ultraviolet ray absorber (E), which will be described later, and the curability of the active energy ray curable component (C) is further improved; therefore, the obtained adhesive has high cohesive force, and the previously described storage elastic modulus and gel fraction can be more readily satisfied. On the other hand, the upper limit of the above maximum absorption wavelength is not particularly limited, but may be preferably 450 nm or less, particularly preferably 410 nm or less, and further preferably 405 nm or less from the viewpoint of preventing the progress of the curing reaction when the adhesive layer 11 is stored in environmental light such as a fluorescent lamp.

Additionally or alternatively, the absorbance of the photopolymerization initiator (D) at a wavelength of 380 nm in an acetonitrile solution having a concentration of 0.1 mass % may be preferably 0.3 or more, more preferably 0.5 or more, and particularly preferably 1.0 or more. The upper limit of the absorbance is not particularly limited, but may be usually preferably 2.5 or less and particularly preferably 2.0 or less. When the absorbance exceeds 2.5, the curing reaction of the active energy ray curable component (C) by the photopolymerization initiator (D) proceeds with the environmental light such as a fluorescent lamp during the formation or storage of the adhesive sheet, and the durability may deteriorate during the subsequent use. Here, the measurement method for the absorbance of the photopolymerization initiator (D) is as described in the Testing Example, which will be described later.

Examples of such a photopolymerization initiator (D) include 2,4,6-trimethylbenzoyl-diphenyl-phosphine oxide and bis(2,4,6-trimethylbenzoyl)-phenylphosphine oxide. These may each be used alone or two or more types may also be used in combination.

The content of the photopolymerization initiator (D) in the adhesive composition P may be preferably 0.1 mass parts or more, particularly preferably 1 mass part or more, and further preferably 5 mass parts or more as the lower limit with respect to 100 mass parts of the active energy ray curable component (C). From another aspect, the upper limit may be preferably 30 mass parts or less, particularly preferably 15 mass parts or less, and preferably 10 mass parts or less. When the content of the photopolymerization initiator (D) is within the above range, it is less likely to be inhibited by the ultraviolet ray absorber (E), which will be described below, the photopolymerization initiator (D) is cleaved without any problem, the curability of the active energy ray curable component (C) is further improved, and it is easy to satisfy the previously described condition for the difference spectrum and the previously described difference in the gel fraction. Moreover, the previously described storage elastic modulus and gel fraction can be readily satisfied.

(1-5) Ultraviolet Ray Absorber (E)

An ultraviolet ray absorber with which the adhesive layer 11 can achieve the ultraviolet ray absorbability can be used as the ultraviolet ray absorber (E), and it may be preferred to use the ultraviolet ray absorber (E) with which the adhesive layer 11 can satisfy the previously described optical properties. Additionally or alternatively, the peak region of the light absorption wavelength of the ultraviolet ray absorber (E) may be preferably different from the peak region of the light absorption wavelength of the above-described photopolymerization initiator (D).

The absorption maximum wavelength of the absorbance of the ultraviolet ray absorber (E) at a wavelength of 200 to nm in an acetonitrile solution having a concentration of 0.1 mass % may be preferably 400 nm or less, particularly preferably 390 nm or less, and further preferably 380 nm or less. When there is a plurality of absorption maximum wavelengths of the absorbance at a wavelength of 200 to 500 nm, it suffices that at least one absorption maximum wavelength is within the above range. In this case, irradiation with the above active energy rays allows the photopolymerization initiator (D) to be cleaved without any problem and without being hindered by the ultraviolet ray absorber (E), and the curability of the active energy ray curable component (C) is further improved; therefore, the obtained adhesive has high cohesive force, and the previously described storage elastic modulus and gel fraction can be readily satisfied. On the other hand, the lower limit of the above absorption maximum wavelength is not particularly limited, but may be preferably 200 nm or more, particularly preferably 250 nm or more, and further preferably 280 nm or more from the viewpoint of protecting various members from ultraviolet rays.

Examples of the ultraviolet ray absorber (E) include compounds such as benzophenone-based, benzotriazole-based, benzoate-based, benzoxazinone-based, triazine-based, phenylsalicylate-based, cyanoacrylate-based, and nickel complex salt-based compounds. These may each be used alone or two or more types may also be used in combination.

Among the above examples of the ultraviolet ray absorber (E), the benzophenone-based compound or the benzotriazole-based compound may be preferably used, and it may be preferred to use the benzophenone-based compound. These compounds tend to have excellent compatibility with the previously described (meth)acrylic ester polymer (A), the active energy ray curable component (C), and the like, and the obtained adhesive may readily satisfy the previously described optical properties.

Preferred examples of the benzophenone-based compound include 2,2-dihydroxy-4-methoxybenzophenone, 2,4-dihydroxybenzophenone, 2-hydroxy-4-methoxybenzophenone, 2-hydroxy-4-methoxybenzophenone-5-sulfonic acid hydrate, and 2-hydroxy-4-n-octyloxybenzophenone. Preferred examples of the benzotriazole-based compound include 2-(2-hydroxy-5-t-butylphenyl)-2H-benzotriazole, octyl-3-[3-t-butyl-4-hydroxy-5-(5-chloro-2H-benzotriazole-2-yl]phenyl) propionate, and 2-ethylhexyl-3-[3-t-butyl-4-hydroxy-5-(5-chloro-2H-benzotriazole-2-yl]phenyl) propionate. These may each be used alone or two or more types may also be used in combination.

The content of the ultraviolet ray absorber (E) in the adhesive composition P may be preferably an amount that satisfies the following condition. That is, when the content of the ultraviolet ray absorber (E) in the adhesive layer 11 is X mass % and the thickness of the adhesive layer is Y μm, the following Expression (I) may be preferably satisfied.

$$90 \leq X \times Y \leq 1000 \quad (I)$$

When the content of the ultraviolet ray absorber (E) is an amount that satisfies the above condition, the previously described optical properties of the adhesive layer 11 can be more effectively satisfied.

From the above viewpoint, the lower limit of X×Y in the above Expression (I) may be preferably 90 or more, more preferably 120 or more, particularly preferably 180 or more, and further preferably 230 or more. From another aspect, the upper limit of X×Y in the above Expression (I) may be preferably 1000 or less, more preferably 600 or less, particularly preferably 400 or less, and further preferably 300 or less.

The lower limit of the content of the ultraviolet ray absorber (E) in the adhesive composition P may be preferably 0.01 mass parts or more, more preferably 0.10 mass parts or more, particularly preferably 0.50 mass parts or more, and preferably 1.0 mass parts or more with respect to 100 mass parts of the active energy ray curable component (C). When the lower limit of the content of the ultraviolet ray absorber (E) is as the above, the obtained adhesive can exhibit satisfactory ultraviolet ray absorbability and exhibits excellent light resistance and member protection properties. From another aspect, the upper limit of the content of the ultraviolet ray absorber (E) may be preferably 30 mass parts or less, more preferably 20 mass parts or less, particularly preferably mass parts or less, further preferably 5 mass parts or less, and most preferably 2 mass parts or less with respect to 100 mass parts of the active energy ray curable component (C). When the upper limit of the content of the ultraviolet ray absorber (E) is within the above range, it is easy to satisfy the previously described condition for the difference spectrum, and both the light resistance and the blister resistance can be readily achieved at a high level. Moreover, the previously described storage elastic modulus and gel fraction can be readily satisfied.

(1-6) Various Additives

If desired, the adhesive composition P can contain one or more of various additives, such as a silane coupling agent, an antistatic, a tackifier, an antioxidant, a light stabilizer, a softening agent, a filler, and a refractive index adjuster, which are commonly used in an acrylic-based adhesive. The additives which constitute the adhesive composition P are deemed not to include a polymerization solvent or a diluent solvent, which will be described later.

Here, when the adhesive composition P contains a silane coupling agent, the obtained adhesive has improved interfacial adhesion to a glass member or a plastic plate. This allows the obtained adhesive to be more excellent in the blister resistance.

The silane coupling agent may be preferably an organosilicon compound having at least one alkoxysilyl group in the molecule, which has satisfactory compatibility with the (meth)acrylic ester polymer (A) and light transmittance.

Examples of such a silane coupling agent include polymerizable unsaturated group-containing silicon compounds such as vinyltrimethoxysilane, vinyltriethoxysilane and methacryloxypropyltrimethoxysilane, silicon compounds having an epoxy structure, such as 3-glycidoxypropyltrimethoxysilane and 2-(3,4-epoxycyclohexyl)ethyltrimethoxysilane, mercapto group-containing silicon compounds such as 3-mercaptopropyltrimethoxysilane, 3-mercaptopropyltriethoxysilane and 3-mercaptopropyldimethoxymethylsilane, amino group-containing silicon compounds such as 3-aminopropyltrimethoxysilane, N-(2-aminoethyl)-3-aminopropyltrimethoxysilane and N-(2-aminoethyl)-3-aminopropylmethyldimethoxysilane, 3-chloropropyltrimethoxysilane, 3-isocyanatepropyltriethoxysilane, and condensates of at least one of these and an alkyl group-containing silicon compound such as methyltriethoxysilane, ethyltriethoxysilane, methyltrimethoxysilane and ethyltrimethoxysilane. These may each be used alone or two or more types may also be used in combination.

When the adhesive composition P contains a silane coupling agent, the content of the silane coupling agent may be preferably 0.01 mass parts or more, particularly preferably 0.05 mass parts or more, and further preferably 0.1 mass parts or more with respect to 100 mass parts of the (meth)acrylic ester polymer (A). From another aspect, the content may be preferably 2 mass parts or less, particularly preferably 1 mass part or less, and further preferably 0.5 mass parts or less. When the content of the silane coupling agent is within the above range, the interfacial adhesion to an adherend is improved and the blister resistance is readily developed.

(1-7) Production of Adhesive Composition

The adhesive composition P can be produced through producing the (meth)acrylic ester polymer (A) and mixing the obtained (meth)acrylic ester polymer (A), the crosslinker (B), and the active energy ray curable component (C) and, if desired, the ultraviolet ray absorber (E) and additives.

The (meth)acrylic ester polymer (A) can be produced by polymerizing a mixture of the monomers which constitute the polymer using a commonly-used radical polymerization method. Polymerization of the (meth)acrylic ester polymer (A) may be preferably carried out by a solution polymerization method, if desired, using a polymerization initiator. Examples of the polymerization solvent include ethyl acetate, n-butyl acetate, isobutyl acetate, toluene, acetone, hexane, and methyl ethyl ketone and two or more types thereof may also be used in combination.

Examples of the polymerization initiator include azo-based compounds and organic peroxides and two or more types thereof may also be used in combination. Examples of the azo-based compounds include 2,2'-azobisisobutyronitrile, 2,2'-azobis(2-methylbutyronitrile), 1,1'-azobis(cyclohexane 1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), and 2,2'-azobis[2-(2-imidazolin-2-yl)propane].

Examples of the organic peroxides include benzoyl peroxide, t-butyl perbenzoate, cumene hydroperoxide, diisopropyl peroxydicarbonate, di-n-propyl peroxydicarbonate, di(2-ethoxyethyl)peroxydicarbonate, t-butyl peroxyneodecanoate, t-butyl peroxybivalate, (3,5,5-trimethylhexanoyl) peroxide, dipropionyl peroxide, and diacetyl peroxide.

In the above polymerization step, the weight-average molecular weight of the polymer to be obtained can be adjusted by compounding a chain transfer agent such as 2-mercaptoethanol.

After the (meth)acrylic ester polymer (A) is obtained, the adhesive composition P (coating solution) diluted with a solvent can be obtained through adding the crosslinker (B), the active energy ray curable component (C), and the ultraviolet ray absorber (E) and, if desired, the photopolymerization initiator (D), additives, and a dilution solvent to the solution of the (meth)acrylic ester polymer (A) and sufficiently mixing them. If any of the above components is in the form of a solid, or if precipitation occurs when the component is mixed with another component in an undiluted state, the component may be preliminarily dissolved in or diluted with a dilution solvent alone and then mixed with the other component.

Examples of the dilution solvent for use include aliphatic hydrocarbons such as hexane, heptane and cyclohexane, aromatic hydrocarbons such as toluene and xylene, halogenated hydrocarbons such as methylene chloride and ethylene chloride, alcohols such as methanol, ethanol, propanol, butanol and 1-methoxy-2-propanol, ketones such as acetone, methyl ethyl ketone, 2-pentanone, isophorone and cyclohexanone, esters such as ethyl acetate and butyl acetate, and cellosolve-based solvents such as ethyl cellosolve.

The concentration/viscosity of the coating solution thus prepared is not particularly limited and can be appropriately selected depending on the situation, provided that the concentration/viscosity is within any range in which the coating is possible. For example, the adhesive composition P may be diluted to a concentration of 10 to 60 mass %. When obtaining the coating solution, the addition of a dilution solvent or the like is not a necessary condition, and the dilution solvent may not be added if the adhesive composition P has a viscosity or the like that enables the coating. In this case, the adhesive composition P may be a coating solution in which the polymerization solvent itself for the (meth)acrylic ester polymer (A) is used as a dilution solvent.

(1-8) Thickness of Adhesive Layer

The thickness of the adhesive layer 11 in the adhesive sheet 1 according to the present embodiment may be preferably 20 µm or more, more preferably 50 µm or more, particularly preferably 100 µm or more, further preferably 150 µm or more, and most preferably 180 µm or more. From another aspect, the thickness of the adhesive layer 11 may be preferably 1000 µm or less, more preferably 800 µm or less, particularly preferably 500 µm or less, further preferably 400 µm or less, and most preferably 300 µm or less. When the thickness of the adhesive layer 11 is within the above range, it is easy to exhibit desired adhesive strength and excellent blister resistance.

(2) Release Sheets

The release sheets 12a and 12b are to protect the adhesive layer 11 until the use of the adhesive sheet 1 and are removed when using the adhesive sheet 1 (adhesive layer 11). In the adhesive sheet 1 according to the present embodiment, one or both of the release sheets 12a and 12b may not necessarily be required.

Examples of the release sheets 12a and 12b for use include a polyethylene film, a polypropylene film, a polybutene film, a polybutadiene film, a polymethylpentene film, a polyvinyl chloride film, a vinyl chloride copolymer film, a polyethylene terephthalate film, a polyethylene naphthalate film, a polybutylene terephthalate film, a polyurethane film, an ethylene vinyl acetate film, an ionomer resin film, an ethylene-(meth)acrylic acid copolymer film, an ethylene- (meth)acrylic ester copolymer film, a polystyrene film, a polycarbonate film, a polyimide film, and a fluorine resin film. Crosslinked films thereof may also be used. Laminate films each obtained by laminating a plurality of such films may also be used.

It may be preferred to perform release treatment for the release surfaces (in particular, surfaces to be in contact with the adhesive layer 11) of the release sheets 12a and 12b. Examples of a release agent to be used for the release treatment include alkyd-based, silicone-based, fluorine-based, unsaturated polyester-based, polyolefin-based, and wax-based release agents. One of the release sheets 12a and 12b may be preferably a tight release sheet that requires higher peeling force while the other may be preferably an easy release sheet that requires lower peeling force.

The thickness of the release sheets 12a and 12b is not particularly limited, but may be usually about 20 to 150 μm.

3. Production of Adhesive Sheet

An example of producing the adhesive sheet 1 may include coating the release surface of one release sheet 12a (or 12b) with a coating solution of the above adhesive composition P, performing heat treatment to thermally crosslink the adhesive composition P to form a coating layer, and overlapping the release surface of the other release sheet 12b (or 12a) on the coating layer. When an aging period is necessary, the above coating layer may become the adhesive layer 11 after the aging period passes, while when an aging period is not necessary, the above coating layer formed as such may be the adhesive layer 11. The above adhesive sheet 1 can thus be obtained.

The heating temperature of the above heat treatment may be preferably 50° C. to 150° C. and particularly preferably 70° C. to 120° C. The heating time may be preferably 10 seconds to 10 minutes and particularly preferably 50 seconds to 2 minutes. Drying treatment when volatilizing a diluent solvent and the like from the coating film of the adhesive composition P applied to a desired object can also serve as the above heat treatment.

After the heat treatment, if necessary, an aging period at an ordinary temperature (e.g., 23° C., 50% RH) for about 1 to 2 weeks may be provided. When the aging period is necessary, the adhesive layer 11 is formed after the aging period passes, while when the aging period is not necessary, the adhesive layer 11 is formed after the heat treatment.

Another example of producing the adhesive sheet 1 may include coating the release surface of one release sheet 12a with a coating solution of the above adhesive composition P and performing heat treatment to thermally crosslink the adhesive composition P to form a coating layer, thus obtaining the release sheet 12a with the coating layer. The example may further include coating the release surface of the other release sheet 12b with the coating solution of the above adhesive composition P and performing heat treatment to thermally crosslink the adhesive composition P to form a coating layer, thus obtaining the release sheet 12b with the coating layer. Then, the release sheet 12a with the coating layer and the release sheet 12b with the coating layer are bonded so that both the coating layers are in contact with each other. When an aging period is necessary, the above laminated coating layers may become the adhesive layer 11 after the aging period passes, while when an aging period is not necessary, the above laminated coating layers formed as such may be the adhesive layer 11. The above adhesive sheet 1 can thus be obtained. According to this production example, even when the adhesive layer 11 is thick, stable production is possible.

Examples of the method of coating with the coating solution of the adhesive composition P include a bar coating method, a knife coating method, a roll coating method, a blade coating method, a die coating method, and a gravure coating method.

<Structural Body>

As illustrated in FIG. 2, the structural body 2 according to the present embodiment is configured to include the first structural member 21 (one structural member), the second structural member 22 (the other structural member), and the cured adhesive layer 11' that is located between the first structural member 21 and the second structural member 22 and bonds the first structural member 21 and the second structural member 22 together. The cured adhesive layer 11' may be obtained by curing the previously described adhesive layer 11 of the adhesive sheet 1 by irradiation with active energy rays.

In the present specification, the cured adhesive layer 11' refers to one in which the adhesive layer 11 is completely cured, or in particular one in which the rate of increase in the gel fraction of the cured adhesive layer 11' is 10% or less when the cured adhesive layer 11' is further irradiated with active energy rays, or in particular one in which the rate of increase is 5% or less.

The adhesive constituting the cured adhesive layer 11' may preferably have a crosslinked structure composed of the (meth)acrylic ester polymer (A) and the crosslinker (B) and contain a cured product (polymerized product) of the energy ray curable component (C) and, if desired, may further contain the photopolymerization initiator (D) and additives. In this case, it may be considered that the polymerized energy ray curable component (C) is entangled with the crosslinked structure composed of the (meth)acrylic ester polymer (A) and the thermal crosslinker (B) to form a high-dimensional structure.

The cured adhesive layer 11' can exhibit excellent blister resistance because it is obtained by curing the previously described adhesive layer 11 of the adhesive sheet 1. In the structural body 2 according to the present embodiment, therefore, the surface of at least one of the first structural member 21 and the second structural member in contact with the cured adhesive layer 11' may be preferably provided by a resin material. That is, even when outgassing occurs from such a resin material, the cured adhesive layer 11' in the present embodiment can exhibit excellent blister resistance.

At least one of the first structural member 21 and the second structural member 22 may be a resin plate. The resin plate is not particularly limited, and examples thereof include a polycarbonate resin plate, an acrylic resin plate, a PET resin plate, a polystyrene resin plate, a polypropylene resin plate, and a hybrid resin plate thereof. Additionally or alternatively, at least one of the first structural member 21 and the second structural member 22 may be a glass plate. The above glass plate is not particularly limited, and examples thereof include chemically strengthened glass, non-alkali glass, quartz glass, soda-lime glass, barium/strontium-containing glass, aluminosilicate glass, lead glass, borosilicate glass, and barium borosilicate. Additionally or alternatively, at least one of the first structural member 21 and the second structural member 22 may be a laminate including a resin plate, a glass plate, and the like.

The previously described adhesive layer 11 of the adhesive sheet 1 is made of an adhesive having ultraviolet ray absorbability, and the cured adhesive layer 11' of the structural body 2 also has ultraviolet ray absorbability; therefore, it can exhibit excellent light resistance (in particular, member protection properties that represent a performance of protecting the members constituting the structural body 2 from ultraviolet rays). Therefore, the structural body 2 according to the present embodiment may be preferably one that may be irradiated with ultraviolet rays for a long period of time and particularly preferably a display body that is attached to the exterior of a moving object.

Here, the moving object refers to a concept including a vehicle moving on the ground, a flying object flying in the air, a ship moving on the water, and the like, and these movements are not limited to moving outdoors or indoors. The structural body 2 according to the present embodiment may be particularly preferably a display body attached to the exterior of an outdoor moving object. The structural body 2 according to the present embodiment may be preferably a display body attached to the exterior of a vehicle or a flying object, further preferably a display body attached to the exterior of a vehicle, and particularly preferably an electronic license plate. When the structural body 2 according to the present embodiment is the above-described display body, the first structural member 21 and the second structural member 22 may be preferably a cover material and a display device, respectively.

When the first structural member 21 is a cover material, the first structural member 21 may be a resin plate, a glass plate, or a laminate of a resin plate and a glass plate as described above. When the first structural member 21 is a cover material, the thickness of the first structural member 21 may be preferably 0.3 mm or more, particularly preferably 0.5 mm or more, and further preferably 1.0 mm or more. From another aspect, the thickness may be preferably 30 mm or less, particularly preferably 20 mm or less, and further preferably 10 mm or less.

When the second structural member 22 is a display body, examples of the display body include a liquid crystal display (LCD) panel, a light emitting diode (LED) panel, and an organic electroluminescence (organic EL) panel.

Examples of a method of producing the above structural body 2 include a method that includes a bonding step of bonding the first structural member 21 and the second structural member 22 together by the previously described adhesive layer 11 of the adhesive sheet 1 and an irradiation step of irradiating the adhesive layer 11 after the bonding with active energy rays via at least one of the first structural member 21 and the second structural member to cure the adhesive layer 11 to obtain the cured adhesive layer 11'.

In the above bonding step, for example, one of the release sheets 12a of the adhesive sheet 1 is released, and the exposed adhesive layer 11 of the adhesive sheet 1 is bonded to one surface of the first structural member 21. Then, the other release sheet 12b is released from the adhesive layer 11 of the adhesive sheet 1, and the exposed adhesive layer 11 of the adhesive sheet 1 and the second structural member 22 are bonded to each other to obtain a laminate. In another example, the bonding order of the first structural member 21 and the second structural member may be changed.

The active energy rays for irradiation in the above irradiation step refer to electromagnetic wave or charged particle radiation having an energy quantum, and specific examples of the active energy rays include ultraviolet rays and electron rays. Among the active energy rays, ultraviolet rays may be particularly preferred because of easy management.

The light amount of the above ultraviolet rays may be preferably 500 mJ/cm$^2$ or more, particularly preferably 1000 mJ/cm$^2$ or more, and further preferably 2000 mJ/cm$^2$ or more. The cured adhesive layer 11' in the structural body 2 according to the present embodiment is obtained by curing the previously described adhesive layer 11 of the adhesive sheet 1, and the cured adhesive layer 11' having been sufficiently cured can therefore be obtained even with a light amount of about 500 mJ/cm$^2$. The upper limit of the above light amount of ultraviolet rays may be preferably mJ/cm$^2$ or less, particularly preferably 8000 mJ/cm$^2$ or less, further preferably 5000 mJ/cm$^2$ or less, and preferably 3000 mJ/cm$^2$ or less from the viewpoint of preventing the irradiation with excessive ultraviolet rays.

The illuminance of ultraviolet rays can be, for example, about 50 to 1000 mW/cm$^2$. The irradiation with ultraviolet rays can be performed by using a high-pressure mercury lamp, a fusion H lamp, a xenon lamp, or the like.

On the other hand, in the case of irradiation with electron rays, it can be performed by an electron ray accelerator or the like, and the irradiation amount of the electron rays may be preferably about 10 to 1000 krad.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, either the release sheet 12a or 12b in the adhesive sheet 1 may be omitted.

EXAMPLES

Hereinafter, the present invention will be described further specifically with reference to examples, etc., but the scope of the present invention is not limited to these examples, etc.

Example 1

1. Preparation of (Meth)Acrylic Ester Polymer (A)

The (meth)acrylic ester polymer (A) was prepared by using a solution polymerization method to copolymerize 30 mass parts of 2-ethylhexyl acrylate, 25 mass parts of n-butyl acrylate, 5 mass parts of 4-acryloylmorpholine, 15 mass parts of isobornyl acrylate, and 25 mass parts of 2-hydroxyethyl acrylate. The molecular weight of the (meth)acrylic ester polymer (A) was measured by the method, which will be described later. The weight-average molecular weight (Mw) was 600,000.

2. Preparation of Adhesive Composition

The coating solution of an adhesive composition was obtained through mixing and sufficiently stirring 100 mass parts (solid content equivalent, here and hereinafter) of the (meth)acrylic ester polymer (A) obtained in the above step 1, 0.2 mass parts of trimethylol propane-modified tolylene diisocyanate as the crosslinker (B), 8.0 mass parts of ε-caprolactone-modified tris-(2-acryloxyethyl) isocyanurate as the active energy ray curable component (C), 0.8 mass parts of 2,4,6-trimethylbenzoyl-diphenyl-phosphine oxide as the photopolymerization initiator (D), 1.3 mass parts of a benzophenone-based ultraviolet ray absorber (available from CYTEC INDUSTRIES, "CYASORB UV-24") as the ultraviolet ray absorber (E), and 0.2 mass parts of 3-glycidoxypropyltrimethoxysilane as the silane coupling agent and diluting the mixture with methyl ethyl ketone.

3. Production of Adhesive Sheet

The release-treated surface of a tight release sheet (available from LINTEC Corporation, product name "SP-PET752150") was coated with the coating solution of the adhesive composition obtained in the above step 2 by using a knife coater, and heat treatment was performed at 90° C. for 1 minute to form a coating layer (thickness: 200 μm). In the tight release sheet, one surface of a polyethylene terephthalate film was subjected to release treatment by using a silicone-based release agent. The surface on the coating layer side in the obtained tight release sheet with the coating layer and the release-treated surface of an easy release sheet (available from LINTEC Corporation, product name "SP-PET381130") were bonded to each other and aged under a condition of 23° C. and 50% RH for 7 days to produce an adhesive sheet having a configuration of tight release sheet/pressure sensitive adhesive layer (thickness: 200 μm)/easy release sheet. In the easy release sheet, one surface of a polyethylene terephthalate film was subjected to release treatment by using a silicone-based release agent.

The thickness of the above pressure sensitive adhesive layer is a value measured using a constant-pressure thickness meter (available from TECLOCK Co., Ltd., product name "PG-02") in accordance with JIS K7130.

The previously described weight-average molecular weight (Mw) refers to a weight-average molecular weight that is measured as a polystyrene equivalent value under the following condition using gel permeation chromatography (GPC) (GPC measurement).

«Measurement Condition»
   GPC measurement device: HLC-8320 available from Tosoh Corporation
   GPC columns (passing through in the following order): available from Tosoh Corporation
   TSK gel super H-H
   TSK gel super HM-H
   TSK gel super H2000
   Solvent for measurement: tetrahydrofuran
   Measurement temperature: 40° C.

Examples 2 to 8 and Comparative Examples 1 to 5

Adhesive sheets were produced in the same manner as in Example 1 except that the composition of monomers constituting the (meth)acrylic ester polymer (A), the weight-average molecular weight (Mw) of the (meth)acrylic ester polymer (A), the type and compounding amount of the crosslinker (B), the type and compounding amount of the active energy ray curable component (C), the type and compounding amount of the photopolymerization initiator (D), the compounding amount of the ultraviolet ray absorber (E), and the compounding amount of the silane coupling agent were as listed in Table 1.

<Testing Example 1> (Measurement Related to Difference Spectrum)

Each of the adhesive sheets obtained in Examples and Comparative Examples was irradiated with ultraviolet rays under the following condition through the easy release sheet to cure the pressure sensitive adhesive layer.

«Ultraviolet Irradiation Condition»
   Using a high-pressure mercury lamp
   Illuminance of 200 mW/cm$^2$ and light amount of 2000 mJ/cm$^2$
   Using "UVPF-A1" available from EYE GRAPHICS CO., LTD. as a UV illuminance/light amount meter Subsequently, after releasing the easy release sheet and the tight release sheet from the cured pressure sensitive adhesive layer, the infrared absorption spectrum was measured by a total reflection measurement method (use of diamond, measurement range: 400 to 4000 cm$^{-1}$) using a Fourier transform infrared spectrophotometer (available from PerkinElmer, product name "Spectrum One") for each of a surface (irradiated surface) of the cured pressure sensitive adhesive layer irradiated with the ultraviolet rays and a surface (non-irradiated surface) opposite to the irradiated surface.

Then, the difference spectrum was obtained by subtracting the infrared absorption spectrum for the non-irradiated surface from the infrared absorption spectrum for the irradiated surface. Furthermore, for the difference spectrum, the maximum value of the absolute value of the absorbance in the range of a wave number of to 1000 cm$^{-1}$ was specified. The maximum value is listed in Table 2 as the maximum value regarding the difference spectrum for a light amount of "2000 mJ/cm$^2$."

Also for the pressure sensitive adhesive layer that was not irradiated with ultraviolet rays and was not cured by irradiation with ultraviolet rays, the maximum value was specified in the same manner as above. The maximum value is listed in Table 2 as the maximum value regarding the difference spectrum for "unirradiated." Furthermore, also for the pressure sensitive adhesive layers for which the light amount in the ultraviolet irradiation condition was changed to 200 mJ/cm$^2$ and 1000 mJ/cm$^2$, the maximum values were specified in the same manner as above. These maximum values are listed in Table 2 as the maximum values regarding the difference spectra for "200 mJ/cm$^2$" and "1000 mJ/cm$^2$."

<Testing Example 2> (Measurement of Gel Fraction)

Each of the adhesive sheets obtained in Examples and Comparative Examples was cut into a size of 80 mm×80 mm, the pressure sensitive adhesive layer was wrapped in a polyester mesh (mesh size of 200), the mass was weighed with a precision balance, and the mass of the pressure sensitive adhesive alone was calculated by subtracting the mass of the above mesh itself. The mass at that time is M1.

Then, the pressure sensitive adhesive wrapped in the above polyester mesh was immersed in ethyl acetate at room temperature (23° C.) for 24 hours. After that, the pressure sensitive adhesive was taken out, air-dried under an environment of a temperature of 23° C. and a relative humidity of 50% for 24 hours, and further dried in an oven at 80° C. for 12 hours. After the drying, the mass was weighed with a precision balance, and the mass of the pressure sensitive adhesive alone was calculated by subtracting the mass of the mesh itself. The mass at that time is M2. The gel fraction (%) is represented by (M2/M1)×100. Through this operation, the gel fraction of the pressure sensitive adhesive was derived. The results are listed in Table 2 as gel fractions of "unirradiated."

In addition, each of the adhesive sheets obtained in Examples and Comparative Examples was irradiated with ultraviolet rays (UV) under the following condition through the easy release sheet to cure the pressure sensitive adhesive layer.

«Ultraviolet Irradiation Condition»
   Using a high-pressure mercury lamp
   Illuminance of 200 mW/cm$^2$ and light amount of 2000 mJ/cm$^2$
   Using "UVPF-A1" available from EYE GRAPHICS CO., LTD. as a UV illuminance/light amount meter Also for the pressure sensitive adhesive of the cured pressure sensitive adhesive layer, the gel fraction (%) was derived in the same manner as above. The results are listed in Table 2 as gel fractions for "2000 mJ/cm$^2$."

Furthermore, also for the pressure sensitive adhesive layers for which the light amount in the ultraviolet irradiation condition was changed to 200 mJ/cm² and 1000 mJ/cm², the gel fractions (%) were derived in the same manner as above. These results are listed in Table 2 as the gel fractions for "200 mJ/cm²" and "1000 mJ/cm²."

In addition, the difference (points) in the gel fraction was calculated by subtracting the gel fraction of "unirradiated" from the gel fraction for "2000 mJ/cm²." The results are also listed in Table 2.

<Testing Example 3> (Measurement of Storage Elastic Modulus of Adhesive Layer)

The tight release sheet and the easy release sheet were released from each of the adhesive sheets produced in Examples and Comparative Examples, and a plurality of pressure sensitive adhesive layers thus obtained was laminated to obtain a laminate having a thickness of 3 mm. A cylindrical body (height of 3 mm) having a diameter of 8 mm was punched out from the obtained laminate of the pressure sensitive adhesive layers, and this was used as a sample.

For the above sample, the storage elastic modulus (G') (MPa) was measured by a torsional shear method in accordance with JIS K7244-6 using a viscoelasticity measurement device (available from REOMETRIC, product name "DYNAMIC ANALYZER") under the following condition. The results are listed in Table 2 as storage elastic moduli of "unirradiated."

Measurement frequency: 1 Hz
Measurement temperature: 23° C.

In addition, a sample was prepared in the same manner as above for the pressure sensitive adhesive layer cured by irradiating each of the adhesive sheets obtained in Examples and Comparative Examples with ultraviolet rays under the following condition through the easy release sheet, and the storage elastic modulus (G') (MPa) was measured. The results are listed in Table 2 as storage elastic moduli for "2000 mJ/cm²."

«Ultraviolet Irradiation Condition»
Using a high-pressure mercury lamp
Illuminance of 200 mW/cm² and light amount of 2000 mJ/cm²
Using "UVPF-A1" available from EYE GRAPHICS CO., LTD. as a UV illuminance/light amount meter <Testing Example 4> (Measurement of Adhesive Strength)

The easy release sheet was released from each of the adhesive sheets obtained in Examples and Comparative Examples, and the exposed pressure sensitive adhesive layer was bonded to the easy-adhesion layer of a polyethylene terephthalate (PET) film having the easy-adhesion layer (available from TOYOBO CO., LTD., product name "PET A4300," thickness: 100 μm) to obtain a laminate of tight release sheet/pressure sensitive adhesive layer/PET film. The obtained laminate was cut into a width of 25 mm and a length of 100 mm.

Subsequently, the tight release sheet was released from the above laminate after the cutting under an environment of 23° C. and 50% RH, and the exposed pressure sensitive adhesive layer was bonded to soda-lime glass (available from Nippon Sheet Glass Company, Ltd.) and pressurized in an autoclave available from KURIHARA SEISAKUSHO Co., Ltd. at 0.5 MPa and 50° C. for 20 minutes to obtain a sample for measurement.

After the sample for measurement was left untouched under a condition of 23° C. and 50% RH for 24 hours, the adhesive strength (N/25 mm) was measured under a condition of a peel speed of 300 mm/min and a peel angle of 180° by using a tensile tester (available from ORIENTEC Co., LTD., product name "TENSILON"). The measurement was conducted in accordance with JIS Z 0237: 2009 except the condition described herein. The results are listed in Table 2 as adhesive strengths of "unirradiated."

In addition, a sample for measurement prepared in the same manner as above was irradiated with ultraviolet rays under the following condition through the PET film to cure the pressure sensitive adhesive layer. Also for the sample for measurement after the curing, the adhesive strength (N/25 mm) was measured in the same manner as above. The results are listed in Table 2 as the adhesive strengths for "2000 mJ/cm²."

«Ultraviolet Irradiation Condition»
Using a high-pressure mercury lamp
Illuminance of 200 mW/cm² and light amount of 2000 mJ/cm²
Using "UVPF-A1" available from EYE GRAPHICS CO., LTD. as a UV illuminance/light amount meter <Testing Example 5> (Measurement of Transmittance)

For the pressure sensitive adhesive layer in each of the adhesive sheets obtained in Examples and Comparative Examples, the transmittance (%) of light rays having a wavelength of 300 to 500 nm was measured by an ultraviolet-visible-near infrared spectrophotometer (available from Shimadzu Corporation, product name "UV-3600"). The transmittances (%) for wavelengths of 360 nm, 380 nm, and nm of the obtained results are listed in Table 2.

<Testing Example 6> (Measurement of Absorbance)

An acetonitrile solution having a concentration of 0.1 mass % of each of the photopolymerization initiators D1 to D3 (details of D1 to D3 are as described below) used in Examples and Comparative Examples was prepared, and the absorbance within a range of a wavelength of 200 to 500 nm in the solution was measured using an ultraviolet-visible-near infrared (UV-Vis-NIR) spectrophotometer (available from Shimadzu Corporation, product name "UV-3600," optical path length of 10 mm). On the basis of the results, the absorbance at a wavelength of 380 nm and the absorption maximum wavelength (nm) at the absorbance at a wavelength of 200 to 500 nm was derived. The results are as follows.

D1 (2,4,6-trimethylbenzoyl-diphenyl-phosphine oxide)

Absorbance at a wavelength of 380 nm: 1.5
Maximum absorption wavelengths: 295 nm, 368 nm, 380 nm, and 393 nm D2 (bis(2,4,6-trimethylbenzoyl)-phenylphosphine oxide)

Absorbance at a wavelength of 380 nm: 1.8
Maximum absorption wavelengths: 295 nm and 370 nm)

D3 (1-Hydroxycyclohexylphenyl ketone)

Absorbance at a wavelength of 380 nm: 0
Maximum absorption wavelengths: 246 nm, 280 nm, and 333 nm <Testing Example 7> (Evaluation of Blister Resistance)

The pressure sensitive adhesive layer of each of the adhesive sheets obtained in Examples and Comparative Examples was interposed between a non-alkali glass plate having a thickness of 1.1 mm and a plastic plate (available from MITSUBISHI GAS CHEMICAL COMPANY, INC., product name "Iupilon Sheet MR-58U," thickness: 0.7 mm). After that, it was autoclaved under a condition of 50° C. and 0.5 MPa for 30 minutes and left untouched at normal pressure at 23° C. and 50% RH for 24 hours.

Then, the pressure sensitive adhesive layer was irradiated with ultraviolet rays under the following condition through the above plastic plate to cure the pressure sensitive adhesive layer into a cured pressure sensitive adhesive layer. The laminate of non-alkali glass plate/cured pressure sensitive adhesive layer/plastic plate thus obtained was used as a sample for measurement.

«Ultraviolet Irradiation Condition»

Using a high-pressure mercury lamp
Illuminance of 200 mW/cm$^2$ and light amount of 2000 mJ/cm$^2$
Using "UVPF-A1" available from EYE GRAPHICS CO., LTD. as a UV illuminance/light amount meter The above sample for measurement was subjected to a test of storing the sample under a low-temperature environment of −40° C. for 72 hours, a test of storing the sample under a high-temperature environment of 95° C. for 72 hours, a test of storing the sample under a high-temperature and high-humidity condition of 85° C. and 85% RH for 72 hours, and a test of irradiating the sample with light rays having a wavelength of 300 to 400 nm at an illuminance of 60 W/m$^2$ for 500 hours using a xenon weatherometer (Xe-WOM).

After that, the state at the interface between the cured pressure sensitive adhesive layer and the plastic plate was visually confirmed, and the blister resistance was evaluated in accordance with the following criteria. The results are listed in Table 2.

○ . . . No bubbles or floating/delamination occurred at the interface.
  Δ . . . No floating/delamination occurred at the interface, but slight bubbles were generated.
  x . . . Bubbles and floating/delamination occurred at the interface.

<Testing Example 8> (Evaluation of Light Resistance)

The surface of an adhesive sheet with a hard coat layer (available from LINTEC Corporation, product name "HA137-75K5A", hard coat layer/base material layer/pressure sensitive adhesive layer (none of these layers has ultraviolet ray absorbability)) on the pressure sensitive adhesive layer side and one surface of a non-alkali glass plate (without ultraviolet ray absorbability) having a thickness of 1.1 mm were bonded via the pressure sensitive adhesive layer of each of the adhesive sheets obtained in Examples and Comparative Examples. After that, it was autoclaved under a condition of 50° C. and 0.5 MPa for 30 minutes and left untouched at normal pressure at 23° C. and 50% RH for 24 hours.

Then, the pressure sensitive adhesive layer was irradiated with ultraviolet rays under the following condition through the above non-alkali glass plate to cure the pressure sensitive adhesive layer into a cured pressure sensitive adhesive layer. The laminate of hard coat layer/base material layer/pressure sensitive adhesive layer/cured pressure sensitive adhesive layer/non-alkali glass plate thus obtained was used as a sample for light resistance evaluation.

«Ultraviolet Irradiation Condition»

Using a high-pressure mercury lamp
Illuminance of 200 mW/cm$^2$ and light amount of 2000 mJ/cm$^2$
Using "UVPF-A1" available from EYE GRAPHICS CO., LTD. as a UV illuminance/light amount meter The above sample for light resistance evaluation was irradiated with light rays having a wavelength of 300 to 400 nm from the non-alkali glass plate side at an illuminance of 60 W/m$^2$ for 500 hours using a xenon weatherometer (Xe-WOM).

After that, a cutter knife was used to vertically and horizontally make 10 cuts with a length of 10 cm at 1 cm intervals on the surface on the hard coat layer side thereby to provide grid-like cuts divided into 1 cm squares. Then, the central portion of the grid-like cuts was rubbed with the pad of a finger to confirm the presence or absence of dropping off of the hard coat layer. Here, when the hard coat layer is deteriorated by the above-described irradiation with light rays, the hard coat layer is likely to drop off. On the basis of the following criteria, the ability to suppress the dropping off of the hard coat layer by the cured the pressure sensitive adhesive layer, that is, the light resistance, was evaluated. The results are listed in Table 2.

○ . . . The hard coat layer did not detach from the base material.
  x . . . The hard coat layer detached from the base material.

Here, Table 1 lists the formulations (solid content equivalents) of the adhesive compositions when the (meth)acrylic ester polymer (A) is 100 mass parts (solid content equivalent). Details of the simplified names listed in Table 1 and additional information are as follows.

<(Meth)Acrylic Ester Polymer (A)>
  2EHA: 2-ethylhexyl acrylate
  BA: n-butyl acrylate
  ACMO: 4-acryloyl morpholine
  IBXA: isobornyl acrylate
  HEA: 2-hydroxyethyl acrylate
  AA: acrylic acid
<Crosslinker (B)>
  B1: trimethylolpropane-modified tolylene diisocyanate
  B2: trimethylolpropane-modified xylylene diisocyanate
  B3: 1,3-bis(N, N-diglycidylaminomethyl) cyclohexane
<Active Energy Ray Curable Component (C)>
  C1: ε-caprolactone-modified tris-(2-acryloxyethyl) isocyanurate
  C2: tricyclodecanedimethanol diacrylate
<Photopolymerization Initiator (D)>
  D1: 2,4,6-trimethylbenzoyl-diphenyl-phosphine oxide
  D2: bis(2,4,6-trimethylbenzoyl) phenylphosphine oxide
  D3: 1-hydroxycyclohexylphenyl ketone

TABLE 1

|  | (Meth)acrylic ester polymer (A) | | Crosslinker (B) | | Active energy ray curable component (C) | | Photopolymerization initiator (D) | | Ultraviolet ray absorber | Silane coupling agent | Thickness of pressure sensitive adhesive layer (μm) |
|---|---|---|---|---|---|---|---|---|---|---|---|
|  | Composition | Mw | Type | Mass parts | Type | Mass parts | Type | Mass parts | Mass parts | Mass parts |  |
| Example 1 | 2EHA/BA/ACMO/ | 600.000 | B1 | 0.2 | C1 | 8.0 | D1 | 0.8 | 1.3 | 0.2 | 200 |
| Example 2 | IBXA/HEA = | | B2 | 0.2 | C1 | 8.0 | D1 | 0.8 | 1.3 | 0.2 | 200 |
| Example 3 | 30/25/5/15/25 | | B1 | 0.2 | C1 | 8.0 | D1 | 0.8 | 1.3 | — | 200 |
| Example 4 | | | B1 | 0.2 | C1 | 10.0 | D1 | 1.0 | 1.3 | 0.2 | 200 |
| Example 5 | | | B1 | 0.2 | C1 | 8.0 | D1 | 0.8 | 1.3 | 0.2 | 250 |
| Example 6 | | | B1 | 0.2 | C2 | 8.0 | D1 | 0.8 | 3.3 | 0.2 | 200 |
| Example 7 | | | B1 | 0.2 | C1 | 8.0 | D2 | 0.8 | 1.3 | 0.2 | 200 |
| Example 8 | BA/AA = 90/10 | 500.000 | B3 | 0.1 | C1 | 10.0 | D1 | 1.0 | 1.3 | 0.2 | 200 |
| Comparative Example 1 | 2EHA/BA/ACMO/ | 600.000 | B1 | 0.2 | — | — | — | — | 1.3 | 0.2 | 200 |
| Comparative Example 2 | IBXA/HEA = | | B1 | 0.2 | C1 | 8.0 | D1 | 0.8 | — | 0.2 | 200 |
| Comparative Example 3 | 30/25/5/15/25 | | B1 | 0.2 | C1 | 8.0 | D1 | 0.8 | 32 | 0.2 | 10 |
| Comparative Example 4 | | | B1 | 0.2 | C1 | 1.0 | D1 | 0.1 | 1.3 | 0.2 | 200 |
| Comparative Example 5 | | | B1 | 0.2 | C1 | 8.0 | D3 | 0.8 | 1.3 | 0.2 | 200 |

TABLE 2

| | Maximum value regarding difference spectrum | | | | Gel fraction (%) | | | | Difference in gel fraction (points) | Storage elastic modulus (MPa) | |
|---|---|---|---|---|---|---|---|---|---|---|---|
| | Unirradiated | 200 mJ/cm² | 1000 mJ/cm² | 2000 mJ/cm² | Unirradiated | 200 mJ/cm² | 1000 mJ/cm² | 2000 mJ/cm² | | Unirradiated | 2000 mJ/cm² |
| Example 1 | 0.000 | 0.019 | 0.002 | 0.002 | 50.0 | 53.0 | 65.0 | 65.0 | 15.0 | 0.08 | 0.30 |
| Example 2 | 0.000 | 0.021 | 0.003 | 0.003 | 39.0 | 41.2 | 56.5 | 58.5 | 19.5 | 0.08 | 0.26 |
| Example 3 | 0.000 | 0.019 | 0.003 | 0.002 | 49.0 | 52.0 | 65.0 | 65.0 | 15.0 | 0.08 | 0.29 |
| Example 4 | 0.000 | 0.025 | 0.005 | 0.002 | 51.6 | 52.2 | 69.3 | 68.1 | 16.5 | 0.08 | 0.31 |
| Example 5 | 0.000 | 0.021 | 0.008 | 0.004 | 50.0 | 52.0 | 60.0 | 64.0 | 14.0 | 0.08 | 0.30 |
| Example 6 | 0.000 | 0.012 | 0.001 | 0.001 | 50.5 | 54.6 | 69.8 | 69.5 | 19.0 | 0.07 | 0.25 |
| Example 7 | 0.000 | 0.008 | 0.003 | 0.003 | 53.4 | 61.1 | 65.8 | 66.4 | 15.0 | 0.09 | 0.26 |
| Example 8 | 0.000 | 0.040 | 0.003 | 0.003 | 52.1 | 51.4 | 66.6 | 71.3 | 19.3 | 0.08 | 0.28 |
| Comparative Example 1 | 0.000 | 0.001 | 0.001 | 0.001 | 53.8 | 53.8 | 54.2 | 56.1 | 2.3 | 0.13 | 0.13 |
| Comparative Example 2 | 0.000 | 0.008 | 0.003 | 0.002 | 52.0 | 60.0 | 68.0 | 70.0 | 18.0 | 0.10 | 0.65 |
| Comparative Example 3 | 0.000 | 0.009 | 0.017 | 0.013 | 25.1 | 25.8 | 27.1 | 27.5 | 2.4 | 0.04 | 0.05 |
| Comparative Example 4 | 0.000 | 0.001 | 0.003 | 0.003 | 54.0 | 54.0 | 54.1 | 54.1 | 0.1 | 0.12 | 0.12 |
| Comparative Example 5 | 0.000 | 0.001 | 0.001 | 0.020 | 48.6 | 48.7 | 49.0 | 49.1 | 0.5 | 0.08 | 0.08 |

| | Adhesion strength (N/25 mm) | | Transmittance (%) | | | Evaluation of blister resistance | | | | Evaluation of light resistance |
|---|---|---|---|---|---|---|---|---|---|---|
| | Unirradiated | 2000 mJ/cm² | 360 nm | 380 nm | 400 nm | −40° C. | 95° C. | 85° C. 85% RH | Xe WOM | |
| Example 1 | 40.0 | 50.0 | ≤1 | ≤1 | 20 | ○ | ○ | ○ | ○ | ○ |
| Example 2 | 34.0 | 52.5 | ≤1 | ≤1 | 19 | ○ | ○ | ○ | ○ | ○ |
| Example 3 | 41.0 | 49.0 | ≤1 | ≤1 | 21 | ○ | ○ | ○ | ○ | ○ |
| Example 4 | 28.0 | 50.0 | ≤1 | ≤1 | 19 | ○ | ○ | ○ | ○ | ○ |
| Example 5 | 45.0 | 56.0 | ≤1 | ≤1 | 5 | ○ | ○ | ○ | ○ | ○ |
| Example 6 | 26.5 | 56.0 | ≤1 | ≤1 | 20 | ○ | Δ | Δ | ○ | ○ |
| Example 7 | 29.0 | 51.5 | ≤1 | ≤1 | 19 | ○ | ○ | ○ | ○ | ○ |
| Example 8 | 39.0 | 43.0 | ≤1 | ≤1 | 18 | ○ | ○ | ○ | ○ | ○ |
| Comparative Example 1 | 33.0 | 33.0 | ≤1 | ≤1 | 22 | ○ | x | x | x | ○ |
| Comparative Example 2 | 30.0 | 58.0 | 84 | 89 | 91 | ○ | ○ | ○ | Δ | x |
| Comparative Example 3 | 13.0 | 22.0 | ≤1 | ≤1 | 11 | ○ | x | x | x | ○ |

TABLE 2-continued

| | | | | | | | | | | |
|---|---|---|---|---|---|---|---|---|---|---|
| Comparative Example 4 | 31.5 | 32.5 | ≤1 | ≤1 | 22 | ○ | x | x | x | ○ |
| Comparative Example 5 | 40.0 | 41.0 | ≤1 | ≤1 | 22 | ○ | x | x | x | ○ |

As found from Table 2, the cured pressure sensitive adhesive layer formed by using each of the adhesive sheets obtained in Examples was excellent in both the blister resistance and the light resistance.

INDUSTRIAL APPLICABILITY

The adhesive sheet of the present invention can be suitably used for producing electronic license plates.

DESCRIPTION OF REFERENCE NUMERALS

1 Adhesive sheet
  11 Adhesive layer
  12a, 12b Release sheet
2 Structural body
  11' Cured adhesive layer
  21 First structural member
  22 Second structural member

The invention claimed is:

1. An adhesive sheet comprising an adhesive layer composed of an adhesive having active energy ray curability and ultraviolet ray absorbability, wherein
when one surface of the adhesive layer is irradiated with ultraviolet rays having a light amount of 2000 mJ/cm$^2$ to cure the adhesive layer and an infrared absorption spectrum is then measured by a total reflection measurement method for each of an irradiated surface that is a surface of the cured adhesive layer irradiated with the ultraviolet rays and a non-irradiated surface that is opposite to the irradiated surface, a maximum value of an absolute value of absorbance is 0.0001 or more and 0.012 or less within a wavenumber range of 700 to 1000 cm$^{-1}$ in a difference spectrum obtained by subtracting the infrared absorption spectrum of the non-irradiated surface from the infrared absorption spectrum of the irradiated surface,
when the adhesive layer is irradiated with ultraviolet rays having a light amount of 2000 mJ/cm$^2$ to cure the adhesive layer, a difference in a gel fraction of the adhesive constituting the adhesive layer before and after the irradiation is 5 points or more and 50 points or less,
the adhesive is obtained by thermally crosslinking a pressure sensitive adhesive composition that contains a (meth)acrylic ester polymer (A), a crosslinker (B), an active energy ray curable component (C) and an ultraviolet ray absorber (E),
a content of the active energy ray curable component (C) in the pressure sensitive adhesive composition is 8 mass parts or more and 15 mass parts or less with respect to 100 mass parts of the (meth)acrylic ester polymer (A), and
a content of the ultraviolet ray absorber (E) in the pressure sensitive adhesive composition is 0.01 mass parts or more and 2 mass parts or less with respect to 100 mass parts of the active energy ray curable component (C).

2. The adhesive sheet according to claim 1, wherein the adhesive layer has a thickness of 20 μm or more and 1000 μm or less.

3. The adhesive sheet according to claim 1, wherein when the adhesive layer is irradiated with ultraviolet rays having a light amount of 2000 mJ/cm$^2$ to cure the adhesive layer, the gel fraction of the adhesive constituting the cured adhesive layer is 40% or more and 95% or less.

4. The adhesive sheet according to claim 1, wherein when the adhesive layer is irradiated with ultraviolet rays having a light amount of 2000 mJ/cm$^2$ to cure the adhesive layer, the cured adhesive layer has a storage elastic modulus of 0.03 MPa or more and 2.00 MPa or less at 23° C.

5. The adhesive sheet according to claim 1, wherein the adhesive constituting the adhesive layer contains a photopolymerization initiator.

6. The adhesive sheet according to claim 1, comprising:
two release sheets; and
the adhesive layer interposed between the two release sheets so as to be in contact with release surfaces of the two release sheets.

7. A structural body comprising:
a first structural member;
a second structural member; and
a cured adhesive layer that bonds the first structural member and the second structural member together,
wherein the cured adhesive layer is obtained by curing the adhesive layer of the adhesive sheet according to claim 1.

8. The structural body according to claim 7, wherein at least one of the first structural member and the second structural member has a surface in contact with the cured adhesive layer, and the surface is provided by a resin material.

9. The structural body according to claim 7, wherein
the first structural member is a cover material,
the second structural member is a display device, and
the structural body is a display body attached to an exterior of a moving object.

10. The structural body according to claim 9, wherein the moving object is a vehicle.

11. A method of producing the structural body according to claim 7, comprising:
bonding the first structural member and the second structural member together by the adhesive layer of the adhesive sheet; and
irradiating the adhesive layer after the bonding with active energy rays via at least one of the first structural member and the second structural member to cure the adhesive layer to obtain the cured adhesive layer.

12. The adhesive sheet according to claim 1, wherein the active energy ray curable component (C) is at least one of selected from tricyclodecanedimethanol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl) isocyanurate, allylated cyclohexyl di(meth)acrylate, ethoxylated bisphenol A diacrylate, 9,9-bis[4-(2-acryloyloxyethoxy) phenyl] fluorene, trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, ε-caprolactone-modified tris-(2-(meth)acryloxyethyl) isocyanurate, diglycerin tetra(meth)acrylate, pentaerythritol tetra(meth)acrylate, propionic acid-modified dipentaerythritol penta(meth)acrylate, dipentaerythritol hexa(meth)acrylate and caprolactone-modified dipentaerythritol hexa(meth)acrylate.

13. The adhesive sheet according to claim 1, wherein the ultraviolet ray absorber (E) is at least one of selected from benzophenone-based compound, benzotriazole-based compound, benzoate-based compound, benzoxazinone-based compound, triazine-based compound, phenylsalicylate-based compound, cyanoacrylate-based compound, and nickel complex salt-based compound.

14. The adhesive sheet according to claim 1, wherein the ultraviolet ray absorber (E) is the benzophenone-based compound, and the benzophenone-based compound is at least one of selected from 2,2-dihydroxy-4-methoxybenzophenone, 2,4-dihydroxybenzophenone, 2-hydroxy-4-methoxybenzophenone, 2-hydroxy-4-methoxybenzophenone-5-sulfonic acid hydrate, and 2-hydroxy-4-n-octyloxybenzophenone.

15. The adhesive sheet according to claim 1, wherein the ultraviolet ray absorber (E) is the benzotriazole-based compound, and the benzotriazole-based compound is at least one of selected from 2-(2-hydroxy-5-t-butylphenyl)-2H-benzotriazole, octyl-3-[3-t-butyl-4-hydroxy-5-(5-chloro-2H-benzotriazole-2-yl]phenyl) propionate, and 2-ethylhexyl-3-[3-t-butyl-4-hydroxy-5-(5-chloro-2H-benzotriazole-2-yl]phenyl) propionate.

* * * * *